United States Patent
Kujiraoka

Patent Number: 5,845,305
Date of Patent: *Dec. 1, 1998

[54] INDEX CREATING APPARATUS

[75] Inventor: Nobuo Kujiraoka, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 539,909

[22] Filed: Oct. 6, 1995

[30] Foreign Application Priority Data

Oct. 11, 1994 [JP] Japan ................................. 6-245009

[51] Int. Cl.$^6$ ............................................. G06F 17/21
[52] U.S. Cl. ........................................ 707/532; 707/529
[58] Field of Search ........................... 395/148, 145, 395/146; 707/500, 526, 529, 530–531, 532, 540, 3

[56] References Cited

U.S. PATENT DOCUMENTS

| | | | |
|---|---|---|---|
| 5,247,437 | 9/1993 | Vale et al. | 707/1 |
| 5,276,616 | 1/1994 | Kuga et al. | 364/419.08 |
| 5,375,235 | 12/1994 | Berry et al. | 395/600 |
| 5,685,003 | 11/1997 | Peltonen et al. | 707/531 |
| 5,717,912 | 2/1998 | Millett et al. | 707/3 |

*Primary Examiner*—Joseph H. Feild

[57] ABSTRACT

An index creating apparatus creates indexes of documents displayed on a display unit. The index creating apparatus includes an analyzing unit for analyzing a format of an index word from an input document and for explaining the index word. A display controller registers a specified portion of a document which is displayed on the display unit as the index word, cancels the specified portion of the document which is displayed on the display unit and registered as the index word and retrieves a specified index word from registered index words. The display controller displays the input document and displays the portion corresponding to the index word on the display unit differently from other portions of the input document. A storage stores information related to the registered index words, and a filling unit obtains an output document by filling the index word into the input document with a predetermined format and outputting the output document.

13 Claims, 27 Drawing Sheets

FIG. 22

★ Index creating apparatus ▷ INDEX CREATING APPARATUS ◁ ◇ is
(READING)

characterized in that it is provided with a ☆ function of automatically
(READING)
extracting index words ▷ FUNCTION OF AUTOMATICALLY EXTRACTING INDEX WORDS ◁ , and that the index words can be simply specified.

FIG. 23A

EXTRACTING SENTENCE
KEYWORD DICTIONARY

⋮ defined is characterized can

⋮

~6

```
┌─ JIS 1ST LEVEL WORD DICTIONARY ─┐
│                                 │
│  亜  阿        A                │
│                                 │
│  哀  逢        AI               │
│                                 │
│  葵  葵        AOI              │
│                                 │
│  茜  茜        ANANE            │
│                                 │
│                      :          │
└─────────────────────────────────┘

┌─ REGISTERED WORD DICTIONARY ────┐
│                                 │
│  取消          TORIKESHI        │
│                                 │
│  復帰          FUKKI            │
│                                 │
│  割り          WARI             │
│                                 │
│                      :          │
└─────────────────────────────────┘
```

FIG. 27

| SPECIFIED RETRIEVING RANGE |
|---|

PLEASE SPECIFY RETRIEVING RANGE.

RETRIEVE ALL DOCUMENTS (A)

RETRIEVE ONLY DISPLAYED DOCUMENTS(D)

CANCEL

INDEX CREATING APPARATUS

BACKGROUND OF THE INVENTION

The present invention generally relates to index creating apparatuses, and more particularly to an index creating apparatus which forms indexes of documents.

Recently, various functions have been added to word processors. An index creating function is one of such functions added to the word processor. However, the conventional index creating function merely creates a document having an index format from a specified word, and the index creating environment is not necessarily sufficient.

There is also a proposed function which inputs a document and creates the index by automatically extracting index forms from the document. However, there is no means for inspecting which words have been selected as the index words, and there is no means for the user to freely specify the index words. For these reasons, there are demands to realize an apparatus which can simply and efficiently create the indexes of a high quality.

Basically, the conventional index creating apparatuses can be categorized into the following two types. According to a first type, the index creating apparatus is built into the word processor as one function of the word processor. In this case, the index words are specified while editing the document, and the specified index words are grouped to create indexes. On the other hand, according to a second type, the index creating apparatus is formed as an independent apparatus. In this latter case, a document from which the indexes are created is input, and the indexes are created by extracting the index words from the input document.

However, according to the first type of index creating apparatus, it was impossible to check from the created indexes the words and the positions thereof which were registered as the index words. In other words, if a plurality of sentences include the same index words, it was impossible to know which index word was registered. In addition, when creating the indexes, it was necessary to specify the index words one by one.

On the other hand, according to the second type of index creating apparatus, it was impossible to check from the created indexes the words and the positions thereof which were registered as the index words, similarly as in the case of the first type of index creating apparatus. In addition, it was difficult for the user to freely specify the words to be registered as the index words.

Therefore, according to the first type of index creating apparatus, there was a problem in that the index words must be specified one by one. Furthermore, according to the second type of index creating apparatus, there was a problem in that it is difficult to freely select the words to be registered as the index words. In addition, in both the first and second types of index creating apparatus, there was a problem in that it is impossible to check from the created indexes the words and the positions thereof which were registered as the index words.

SUMMARY OF THE INVENTION

Accordingly, it is a general object of the present invention to provide a novel and useful index creating apparatus in which the problems described above are eliminated.

Another and more specific object of the present invention is to provide an index creating apparatus which can quickly specify index words and easily retrieve (search) where the specified index words are in a document.

Still another object of the present invention is to provide an index creating apparatus which can simultaneously process a plurality of documents, specify index words in a wide range, automatically extract candidates of the index words, and specify the index words within a short time.

A further object of the present invention is to provide an index creating apparatus which creates indexes of documents displayed on display means, comprising analyzing means for analyzing a format of an index word from an input document and for explaining the index word, first display control means including registering means for registering a specified portion of a document which is displayed on the display means as the index word, canceling means for canceling the specified portion of the document which is displayed on the display means and registered as the index word, and retrieving means for retrieving a specified index word from registered index words, where the first display control means displays the input document and displays the portion corresponding to the index word on the display means differently from other portions of the input document, storage means for storing information related to the registered index words, and filling means for obtaining an output document by filling the index word into the input document with a predetermined format and outputting the output document. According to the index creating apparatus of the present invention, it is possible to specify the index word by displaying the document and simply specifying a portion which the user wishes to register as the index word by a specifying means such as a pointing device, and the index word can be specified very quickly.

Another object of the present invention is to provide the index creating apparatus which further comprises second display control means comprising displaying means for displaying an appearing position of the specified index word in the input document, deleting means for deleting the specified index word, where the second display control means displays the index word read from the storage means on the display means according to a predetermined rule. According to the index creating apparatus of the present invention, since the portion of the displayed document corresponding to the index word is displayed differently from the other portions of the displayed document, it is possible to easily identify the index word.

Still another object of the present invention is to provide the index creating apparatus which further comprises a first dictionary which registers keywords for judging whether or not to extract the index word from each sentence within the input document, a second dictionary which registers keywords for dividing each sentence within the input document, a third dictionary which registers unwanted words inappropriate as the index word, and automatic extracting means for making reference to the first, second and third dictionaries and automatically extracting the index word from the input document. According to the index creating apparatus of the present invention, it is possible to simultaneously process a plurality of documents, and it is possible to easily inspect the portions where the specified index word appears.

A further object of the present invention is to provide the index creating apparatus which further comprises a reading dictionary which registers reading of the registered index words, where the reading indicates how the registered index words are pronounced, and means for making reference to the reading dictionary and automatically adding the reading to the index word registered by the registering means and/or to the index word automatically extracted by the automatic extracting means. According to the index creating apparatus of the present invention, it is possible to specify the index word in a wide range because a plurality of documents can be processed simultaneously.

Another object of the present invention is to provide the index creating apparatus which further comprises third display control means comprising editing means for editing the reading of the index word, and means for registering the index word and the reading of the index word into the reading dictionary. According to the index creating apparatus of the present invention, it is possible to easily inspect from the index whether or not the index word is appropriate, because the appearing position of the index word can be displayed from the index list.

Still another object of the present invention is to provide the index creating apparatus wherein the first display control means includes means for distinguishing and displaying on the display means a kind of index word and a specifying/extracting state of the index word, by instructing the first display control means of the kind of index word such as normal/important index words, existing index word within the input document, the index word specified by the registering means or the specifying/extracting state of the index word such as the index word automatically extracted by the automatic extracting means. According to the index creating apparatus of the present invention, the index word can be specified within a short time since the candidates of the index word can be extracted automatically.

A further object of the present invention is to provide the index creating apparatus wherein the second display control means includes means for displaying on the display means an index word which satisfies a condition, by instructing the the second display control means of a kind of index word such as normal/important index words, existing index word within the input document, the index word specified by the registering means or the specifying/extracting state of the index word such as the index word automatically extracted by the automatic extracting means, and the appearing position of the index word. According to the index creating apparatus of the present invention, it is possible to display the index word and its reading as a pair and edit the pair, so that the reading can be edited accurately and in a simple manner.

Other objects and further features of the present invention will be apparent from the following detailed description when read in conjunction with the accompanying drawings.

BRIEF DESCRIPTION OF THE DRAWINGS

FIG. 22 is a diagram showing a document filled with a format of the index word;

FIGS. 23A, 23B and 23C respectively are diagrams showing registered contents of an extracting sentence keyword dictionary and the like;

FIG. 27 is a diagram showing the display screen of the index creating apparatus.

DESCRIPTION OF THE PREFERRED EMBODIMENTS

Figure 1:
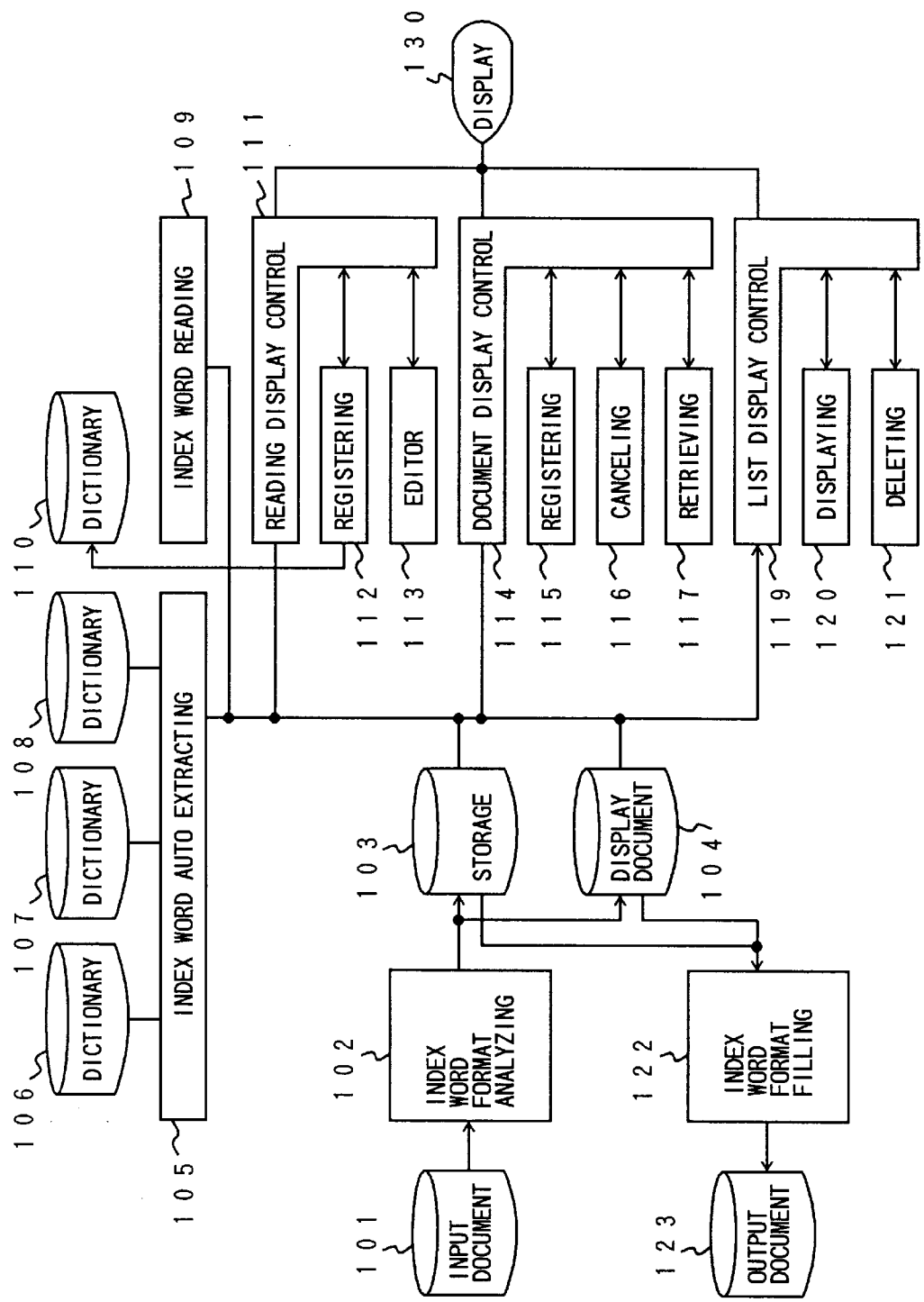
FIG. 1 is a system block diagram for explaining the operating principle of the present invention.

First, a description will be given of the operating principle of the present invention, by referring to FIG. 1. In FIG. 1, an index creating apparatus generally includes an index word format analyzing unit or means 102 supplied with an input document 101, an index information storage unit or means 103, an index word automatic extracting unit or means 105, an extracting sentence keyword dictionary 106, a sentence dividing keyword dictionary 107, an unwanted word deleting dictionary 108, an index word reading unit or means 109, an index word reading dictionary 110, a reading display control unit or means 111 for displaying index word reading, an index word reading dictionary registering part 112, an index word reading editor 113, a document display control unit or means 114, an index word registering part 115, an index word canceling part 116, an index word retrieving part 117, a list display control unit or means 119, a displaying unit or means 120 for displaying index word appearing position, an index word deleting part 121, an index word format filling unit or means 122 which outputs an output document 123, and a display unit 130 coupled to the reading display control unit 111, and units 114 and 119. A display document which is to be displayed is denoted by a reference numeral 104.

According to one aspect of the present invention, the index word format analyzing means 102 analyzes the format of the index words from the input document 101, and extracts the index words. The index word registering part 115 registers target portions of a specified document which is being displayed as the index words. The index word canceling part 116 cancels the index words corresponding to the target portions of the specified document which is being displayed. In addition, the index word retrieving part 117 retrieves the specified index words. The document display control means 114 displays the input document 101 on the display unit 130, and displays the portions corresponding to the index words differently from other document portions on the display unit 130. The index information storage means 103 stores information related to the index words. Furthermore, the index word format filling means 122 fills the index words into the output document 123 with a predetermined format.

Hence, the extraction of the index words within the input document 101, the registration of the information related to the specified index words, and the cancellation and retrieval of the registered index words can be carried out with ease. In addition, the indexes can be created simply and efficiently because the index words can be filled into the output document 123 with the predetermined format.

Particularly because the index words can be specified, deleted and retrieved while displaying the document, it is possible to eliminate the problems of the second type of index creating apparatus described above. In other words, the present invention permits the user to freely specify the words to be registered as the index words.

It is possible to provide additionally the index word appearing position display part 120 which displays the appearing positions of the specified index words, the index word deleting part 121 which deletes the specified index words, and the list display control means 119 which displays the index words read from the index information storage means 103 with a predetermined rule on the display unit 130.

In this case, it is possible to easily select whether or not to use each index word with ease because the list display control means 119 is provided. Particularly because it is possible to display the list of index words (index word list) and to display the appearing positions of the index words and to delete the index words or, to distinguish and display the portions of the document corresponding to the index words, the problems of the conventional index creating apparatuses are eliminated. That is, the present invention can check from the indexes which words are registered as the index words.

It is also possible to additionally provide the extracting sentence keyword dictionary 106 which judges whether or not to extract the index words from each sentence within the input document 101, the sentence dividing keyword dictionary 107 in which keywords which divide the sentence are registered, the unwanted word deleting dictionary 108 in which words inappropriate as the index words are registered, and the index word automatic extracting means 105 which automatically extracts the index words from the input document 101 by referring to the above dictionaries 106 through 108.

In this case, it is possible to automatically extract the index words from the input document 101 and add the extracted index words in the index information storage means 103, because the index word automatic extracting means 105 is provided to automatically extract the index words from the input document 101. Hence, there is no need to specify the index words one by one, and the problems of the first type of index creating apparatus are eliminated.

It is also possible to further provide the index word reading dictionary 110 in which the reading of the index words are registered, and the index word reading means 109 which refers to the index word reading dictionary 110 and automatically adding the reading to the index words registered in the index word registering part 115 and/or the index words extracted by the index word automatic extracting means 105. In the Japanese language, for example, there are many ways to read each Kanji (or Chinese) character and each combination of Kanji characters, and the Kanji character or Kanji character combination can be read phonetically in one or more ways or, read in one or more ways according to the Japanese rendering. The "reading" of the word in this specification refers to how the word such as the Kanji character and the Kanji character combination is read or pronounced.

In this case, it is possible to automatically add the reading to the index words which are extracted by the index word automatic extracting means 105.

It is also possible to further provide the index word reading editing part 113 which edits the reading of the index words, and the index word reading dictionary registering part 112 in which the index words and the reading of the index words in the index word reading dictionary 110 are registered.

In this case, it is possible to freely edit the reading of the index words included in the index information.

The index creating apparatus may be provided with a function of distinguishing and displaying the kind of index word and the specifying/extracting state of the index word, by instructing the document display control means 114 of the kind of index word such as normal/important index words, existing index word within the input document 101, the index word specified by the index word registering part 115 or the specifying/extracting state of the index word such as the index word automatically extracted by the index word automatic extracting means 105.

In this case, it is possible to easily identify the kind and the like of the index word.

The index creating apparatus may be provided with a function of displaying on the display unit 130 the index word which satisfies a condition, by instructing the list display control means 119 of the kind of index word such as normal/important index words, existing index word within the input document 101, the index word specified by the index word registering part 115 or the specifying/extracting state of the index word such as the index word automatically extracted by the index word automatic extracting means 105, and the appearing position of the index word.

In this case, it is also possible to easily identify the kind and the like of the index word.

Figure 2:
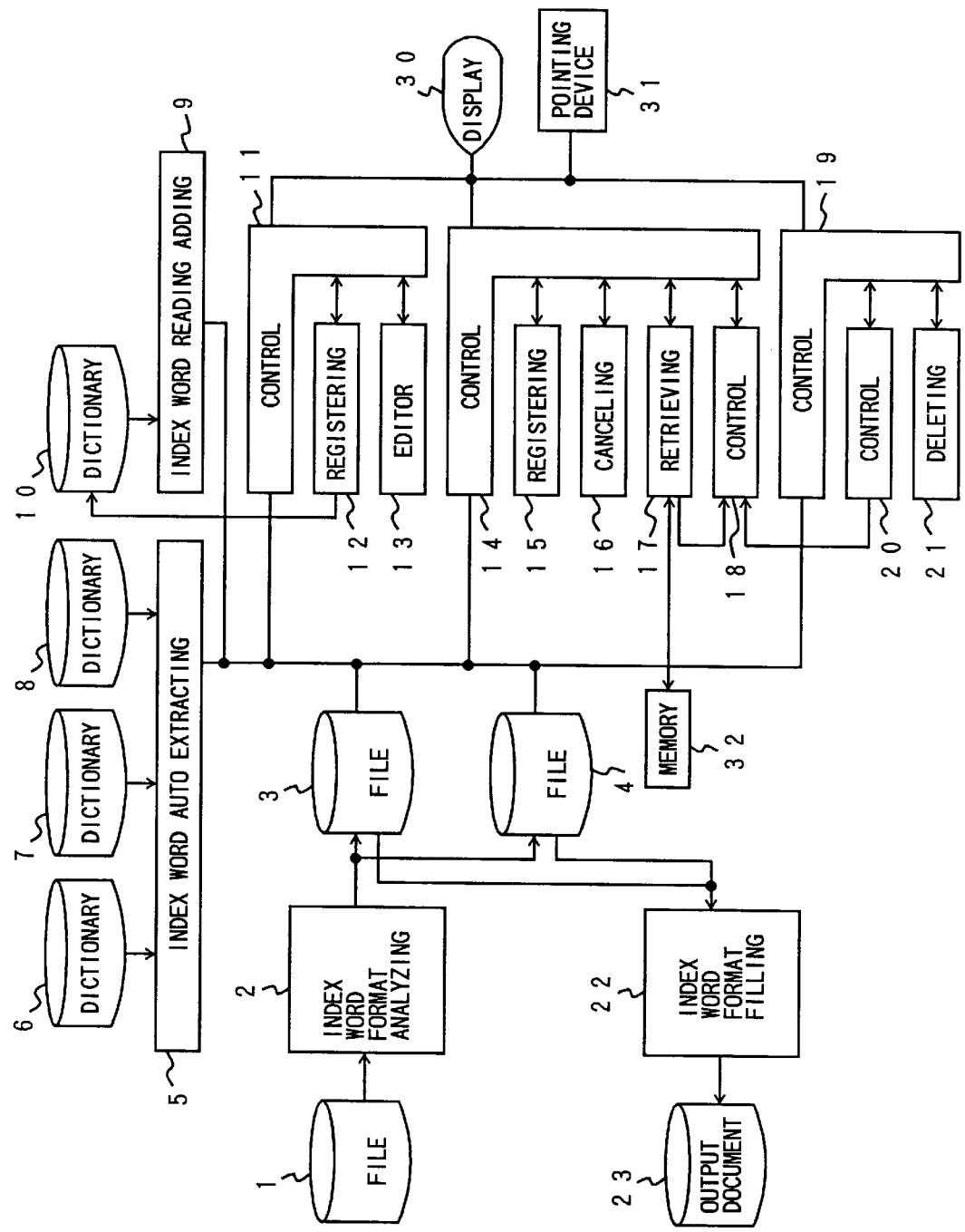
FIG. 2 is a system block diagram showing the construction of an embodiment of an index creating apparatus according to the present invention.

Next, a description will be given of an embodiment of the index creating apparatus according to the present invention. FIG. 2 is a system block diagram showing the construction of this embodiment of the index creating apparatus.

In FIG. 2, an input document storage file 1 stores an input document with respect to which the indexes are to be created. For the sake of convenience, the input document storage file 1 will also be referred to as an input document 1. An index word formal analyzing unit 2 analyzes the format of the index word of the document, and creates the index information and the display document which is to be displayed by judging which words are the index words. The format of the index word of the document will be described later. An index information storage file 3 stores the index information including the document in which the index word appears, and the position, length, attribute, reading and the like of the index word. This index information storage file 3 will also be referred to as index information file 3. A display document storage file 4 stores a plurality of documents which are to be displayed in a format which can be displayed on the screen. The display document storage file 4 will also be referred to as a display document file 4.

An index word automatic extracting unit 5 automatically extracts the index words. In other words, as will be described later, the index word automatic extracting unit 5 obtains 1 sentence at a time from the display document file 4, divides the sentence which includes the word registered in an extracting sentence keyword dictionary 6 by the word in a sentence dividing keyword dictionary 7, and deletes a registered word of an unwanted word deleting dictionary 8 and adds the remaining words into the index information file 3.

An index word reading adding unit 9 retrieves the reading of the index word which is registered by a document display controller 14 or the index word automatic extracting unit 5 from an index word reading dictionary 10, and adds the reading of the index word to the index word. The reading of the index words are registered in the index word reading dictionary 10.

An index word reading display controller 11 displays the index word and the reading of the index word as a pair. An index word reading editor 13 edits the reading of the index word, and an index word reading dictionary registering unit 12 registers the reading of the index word in the index word reading dictionary 10. The index word reading dictionary registering unit 12 and the index word reading editor 13 may be regarded as a part of the index word reading display controller 11.

The document display controller 14 displays the document on a display unit 30 and changes the display of the index word portion so that it is possible to distinguish which portions correspond to the index words. An index word registering unit 15 calculates the portion which is specified by a pointing device 31 which is coupled to the document display controller 14, for example, and registers the calculated portion as the index word. An index word canceling unit 16 calculates the index word which is specified by the pointing device 31, and cancels the registered index word. An index retrieving unit 17 retrieves the word which is registered as the index word. A memory 32 is coupled to the index retrieving unit 17. A display position controller 18 changes the display position to the portion where the index word retrieved by the index word retrieving unit 17 appears. The index word registering unit 15, the index word canceling unit 16, the index word retrieving unit 17 and the display position controller 18 may be regarded as a part of the document display controller 14.

An index word list display controller 19 displays a list of index words (index word list) on the display unit 30. An index word appearing position display controller 20 displays the portion of the document where the index word in the displayed list appears. An index word deleting unit 21 deletes the index word in the displayed list. The index word appearing position display controller 20 and the index word deleting unit 21 may be regarded as a part of the index word list display controller 19.

An index word format filling unit 22 creates an output document 23 from the display document stored in the display document file 4 and the index information stored in the index information file 3. The index word portion of the document is changed into the index word format in the output document 23.

Next, a description will be given of an index creating process of this embodiment.

Figure 3:
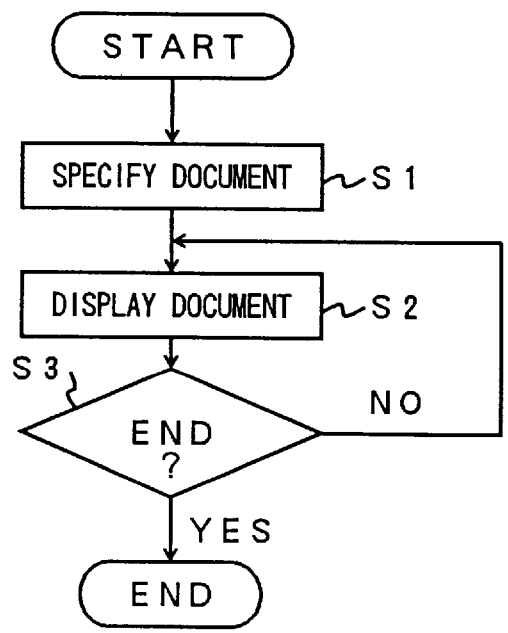
FIG. 3 is a flow chart for explaining an index word specifying process of the index creating apparatus

(1) Index Word Specifying Process of the Index Creating Apparatus:

FIG. 3 is a flow chart for explaining the index word specifying process of the index creating apparatus as a whole. In FIG. 3, a step S1 specifies the document with respect to which the index words are to be specified. A step S2 displays the document as will be described later. A step S3 decides whether or not the index word specifying process is to be ended, and the process returns to the step S2 if the decision result in the step S3 is NO. On the other hand, if the decision result in the step S3 is YES, the index word specifying process of the index creating apparatus ends.

Figure 4:
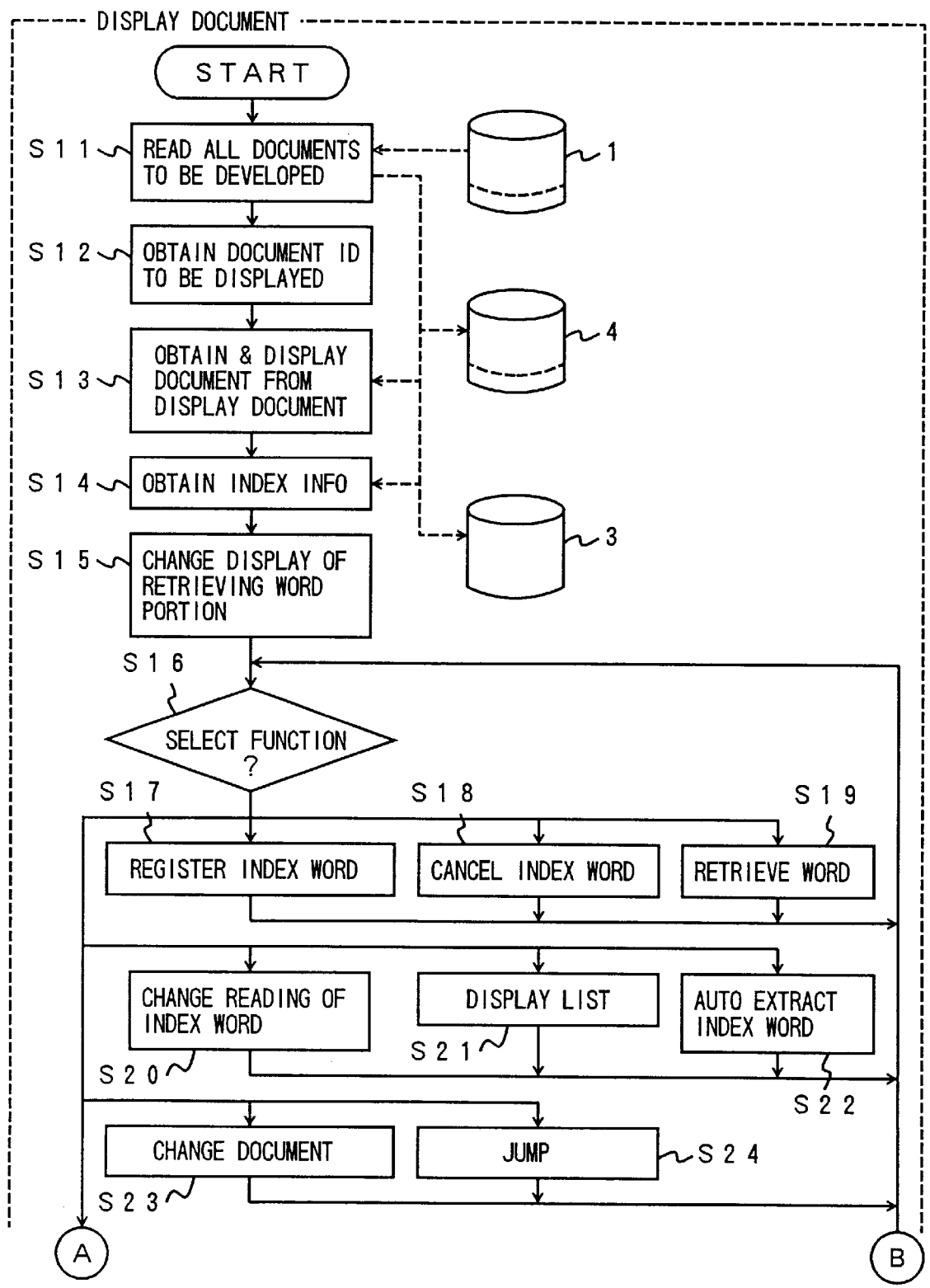
FIG. 4 is a flow chart for explaining a document display process of the index creating apparatus.
Figure 5:
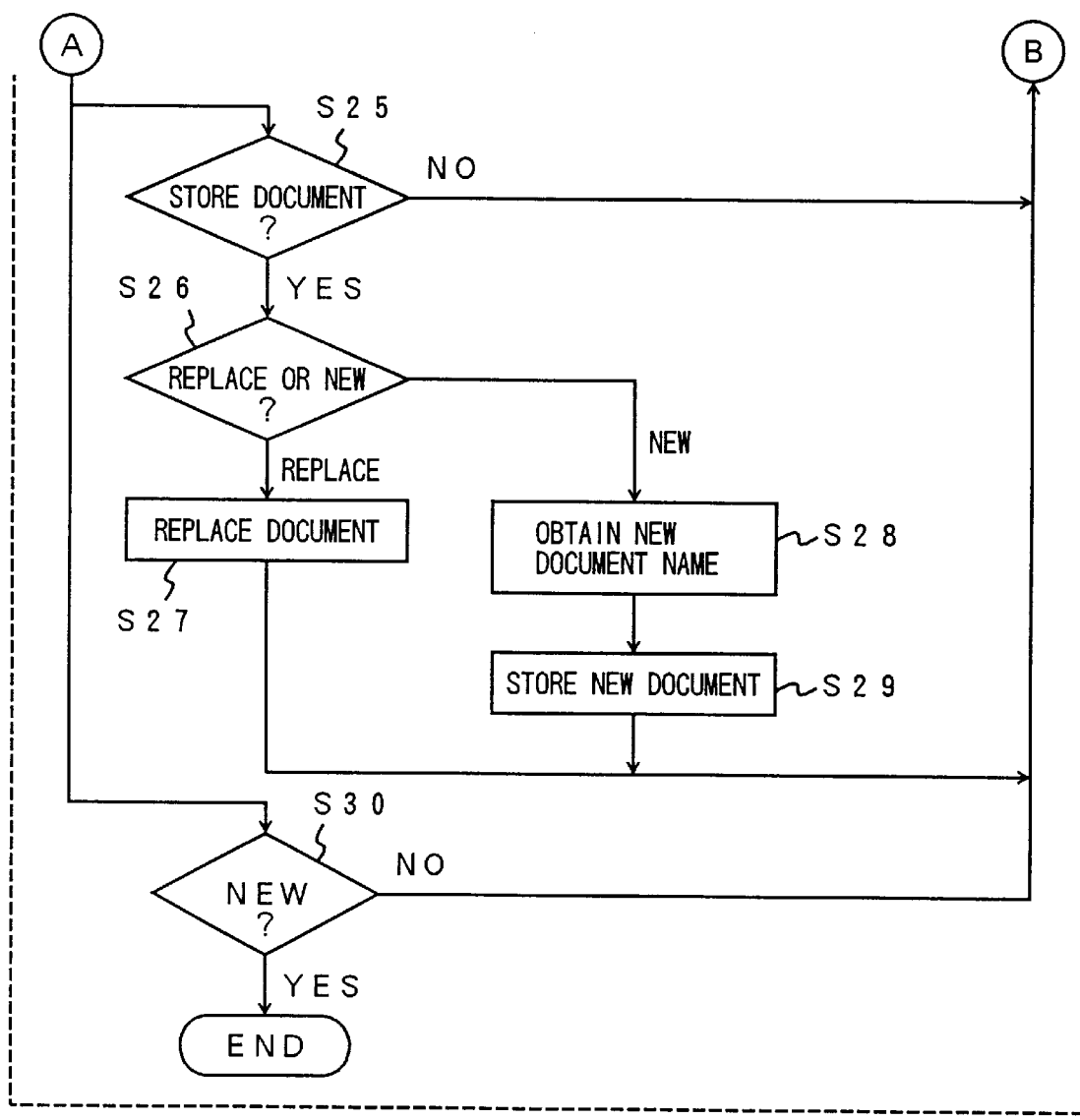
FIG. 5 is a flow chart for explaining the document display process of the index creating apparatus.

A document display process of the step S2 is carried out as shown in the flow charts of FIGS. 4 and 5. The process shown in FIG. 4 corresponds to the operations of the index word format analyzing unit 2 and the document display controller 14 shown in FIG. 2.

In FIG. 4, a step S11 reads all documents to be developed from the input document 1. In this case, the specified documents are read in sequence, and the index word format analyzing unit 2 creates the display document of the display document file 4 and the index information of the index information file 3 while analyzing the format of the index words within the documents. A step S12 obtains a document ID to be displayed, and determines which document is to be displayed. A step S13 obtains the display document which is to be displayed from the display document file 4, and the document display controller 14 displays this display document on the display screen. The steps S11 through S13 are carried out by the index word format analyzing unit 2.

In a step S14, the document display controller 14 obtains the index information from the index information file 3, and changes the display at portions corresponding to the index words of the document which is being displayed on the screen, so that the index word portions can be distinguished from other portions. A step S15 changes the display at portions corresponding to the retrieving words of the document which is being displayed on the screen, so that the portions corresponding to the retrieving words can be distinguished from other portions.

In a step S16, the user selects one of the following functions by use of the pointing device 31, a keyboard (not shown) coupled similarly to the pointing device 31 or the like, so as to carry out the selected process. The selection made by the user is notified to the document display controller 14. Hence, the process advances to one of steps S17 through S24 depending on the function selected by the user. The steps S14 through S24 are carried out by the document display controller 14.

The step S17 carries out an index word registering process to register the index word if the word within the displayed document is to be registered as the index word. The step S18 carries out an index word canceling process to cancel the index word if the specified index word is to be canceled. The step S19 carries out a word retrieving process to retrieve a word. The step S20 carries out a process which changes the reading of the index word if the reading of the index word is to be edited. The step S21 carries out an index word list display process to display the list of index words if the list is to be displayed. The step S22 carries out a process which automatically extracts the index words if the index words are to be extracted automatically. The step S23 carries out a document switching process to switch the document if the document being displayed is to be switched. The step S24 carries out a jump process if the display position is to be changed.

On the other hand, the process advances to a step S25 shown in FIG. 5 which carries out a document storage process if the document is to be stored. If the document display process is to be ended, the process advances to a step S30 which decides whether or not to end the document display process, so as to confirm the end of the document display process. If the decision result in the step S30 is YES, the document display process is ended. On the other hand, the process returns to the step S16 if the decision result in the step S30 is NO.

When the document storing process is selected in the step S16 shown in FIG. 4, the step S25 shown in FIG. 5 decides whether or not the document is to be stored, and the process returns to the step S16 if the decision result in the step S25 is NO. On the other hand, if the decision result in the step S25 is YES, a step S26 decides whether or not the document storage format is "replacement" or "new". The process advances to a step S27 if the document storage format is "replacement", and advances to a step S28 if the document storage format is "new".

If the document storage format is "replacement", the step S27 replaces the document by a document of the reading source. On the other hand, if the document storage format is "new", the step S28 obtains a new document name, and a step S29 stores the new document. The process returns to the step S16 shown in FIG. 4 after the step S27 or S29.

The process shown in FIG. 5 corresponds to the operations of the document display controller 14 and the index word format filling unit 22 shown in FIG. 2. The steps S25, S26, S28 and S30 are carried out by the document display controller 14, and the steps S27 and S29 are carried out by the index word format filling unit 22.

Next, a description will be given of each of the processes carried out by the steps S17 through S24 shown in FIG. 4.

Figure 6:
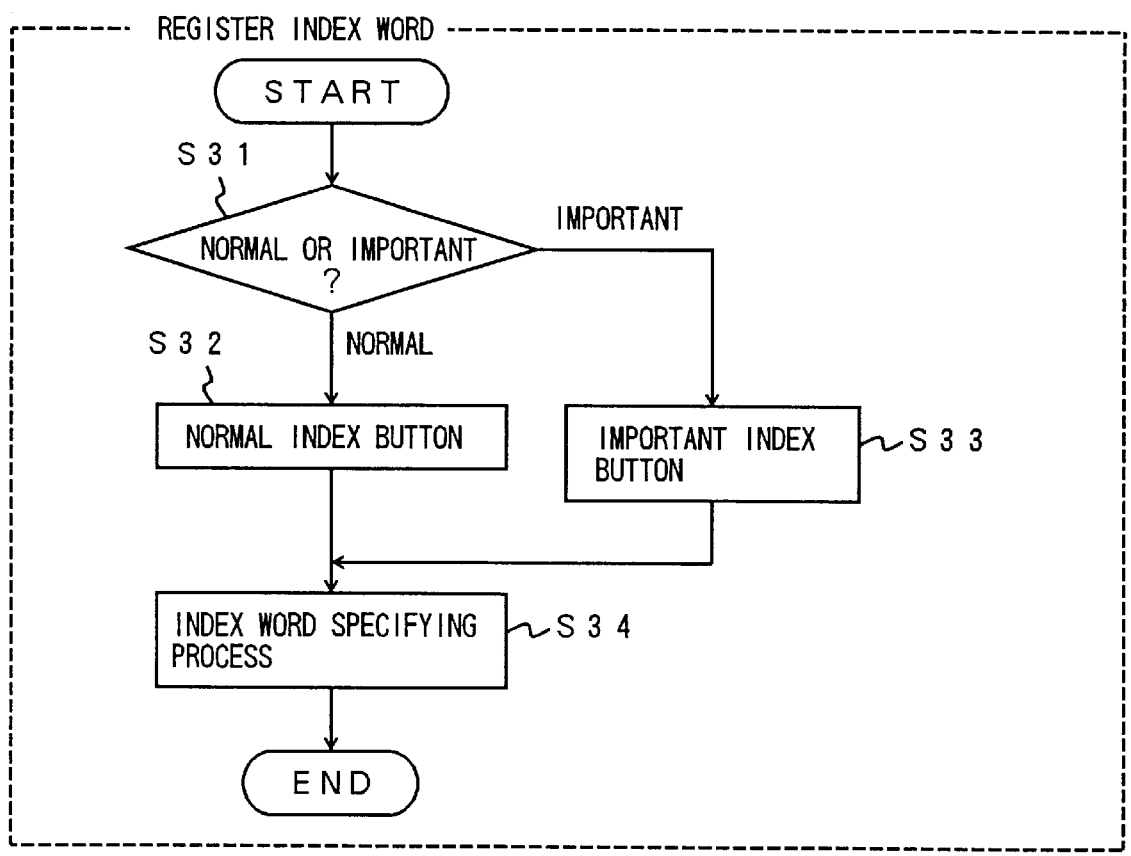
FIG. 6 is a flow chart for explaining an index word registering process of the index creating apparatus.
Figure 7:
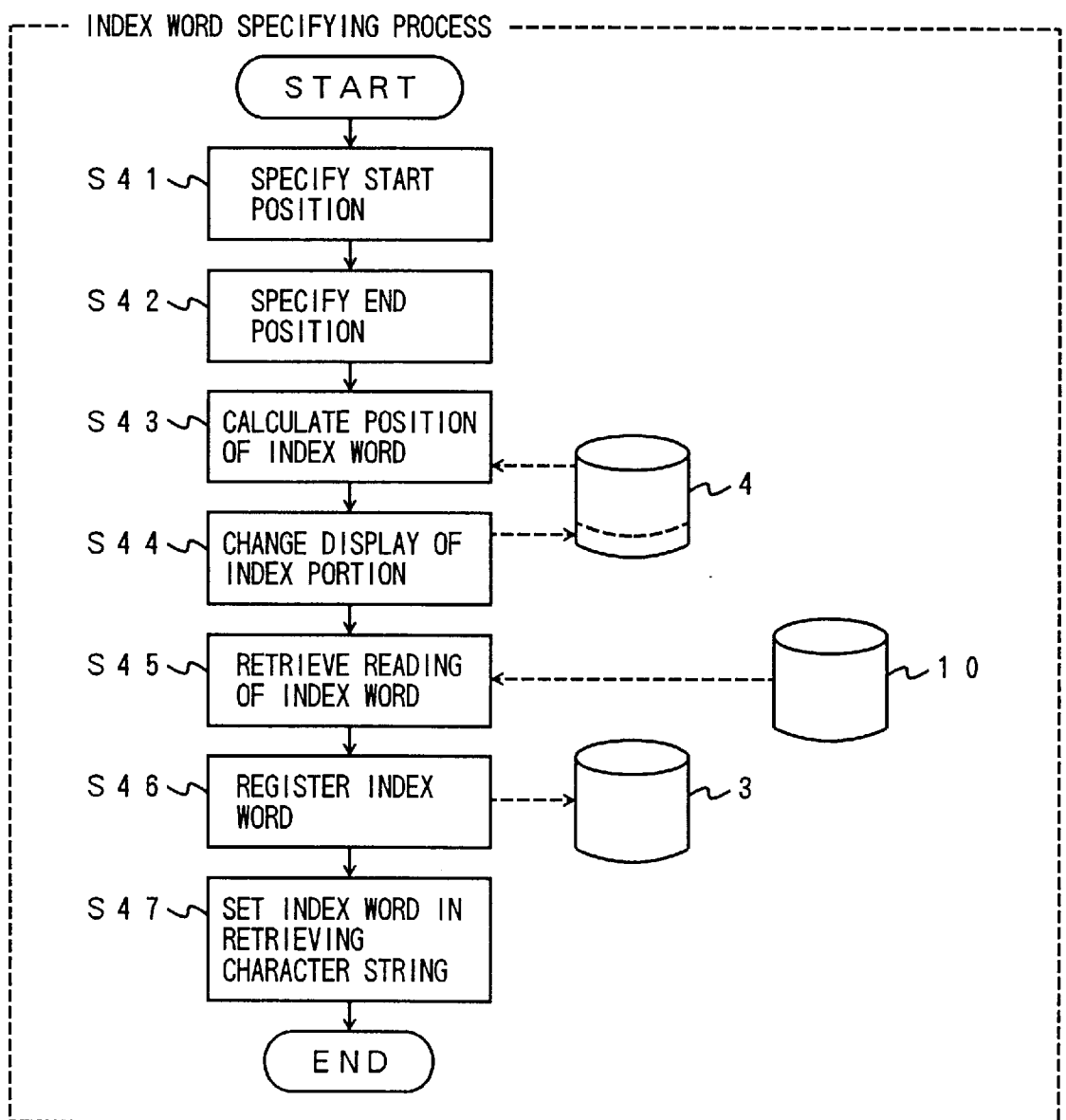
FIG. 7 is a flow chart for explaining the index word registering process of the index creating apparatus.

(1-1) Index Word Registering Process:

FIGS. 6 and 7 respectively are flow charts for explaining the index word registering process. The processes shown in FIGS. 6 and 7 correspond to the operations of the document display controller 14, the index word registering unit 15 and the index word retrieving unit 17 shown in FIG. 2.

In a step S31 shown in FIG. 6, the user selects a normal index word or an important index word. The important index word is defined as being more important than the normal index word among the index words. For example, in the case of an index of a book, a "*" symbol is indicated before the page number or the page number is printed in Gothic type to indicate the important index, and 4 or 5 important indexes may be specified per page. For example, when selecting the normal index word, the user pushes a normal index button of an operation panel (not shown) or keyboard (not shown) which is coupled to the document display controller 14 shown in FIG. 2 in a step S32. The user pushes an important index button of the operation panel or keyboard when selecting the important index word in a step S33. The selection made in the step S32 or S33 is notified to the document display controller 14. In a step S34, the user specifies which portion is to be registered as the index word, and the specified information is notified to the index word registering unit 15. The steps S31 through S33 are carried out by the document display contoller 14, and the step S34 is basically carried out by the index word registering unit 15.

FIG. 7 is a flow chart for explaining an index word specifying process which is carried out by the step S34 shown in FIG. 6.

In a step S41 shown in FIG. 7, the user specifies a start position of the index word within the displayed document by use of the pointing device 31. In a step S42, the user specifies an end position of the index word by use of the pointing device 31. The start and end positions specified by the steps S41 and S42 are notified to the document display unit 14 shown in FIG. 2.

In a step S43, the index word registering unit 15 of the document display controller 14 refers to the display document file 4 and calculates the position of the index word from the specified start and end positions on the screen. In a step S44, the index word registering unit 15 changes the display of the index portion.

A step S45 obtains the reading of the index word by retrieving the index word reading dictionary 10 by the index word reading adding unit 9 as will be described later based on the obtained index word. A step S46 registers the index word into the index information file 3 by the index word automatic extracting unit 5. Then, a step S47 sets the index word as a retrieving character string by the index word registering unit 15, and the index word specifying process ends. A screen control of the Windows system includes an edit control, and the step S47 sets the retrieving character string in this edit control for which a region is allocated by the Windows system.

The steps S43 and S45 are carried out by the index word registering unit 15, the step S44 is carried out by the document display controller 14, and the step S47 is carried out by the index word retrieving unit 17.

Figure 8:
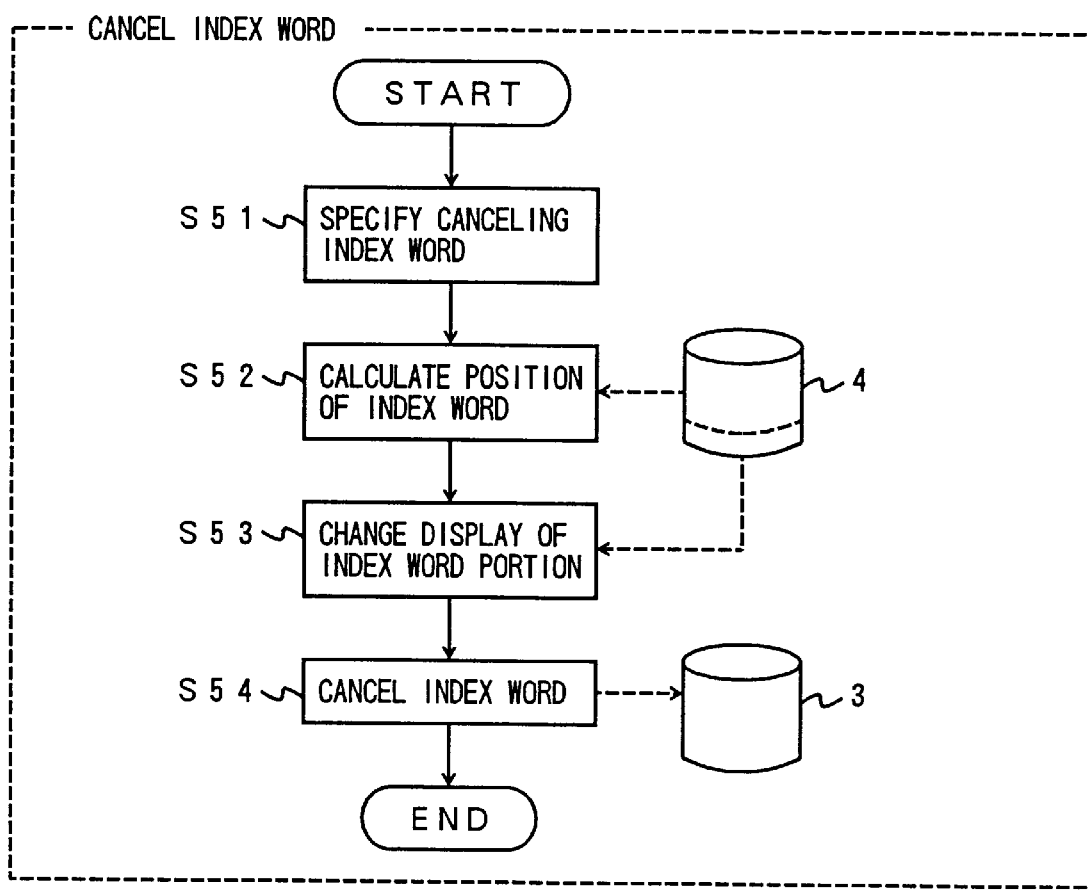
FIG. 8 is a flow chart for explaining an index word canceling process of the index creating apparatus.

(1-2) Index Word Canceling Process:

FIG. 8 is a flow chart for explaining an index word canceling process. The process shown in FIG. 8 corresponds to the operations of the document display unit 14 and the index word canceling unit 16 shown in FIG. 2.

In a step S51 shown in FIG. 8, the user specifies the index word which is displayed on the screen with its display state changed, by use of the pointing device 31. The specified index word is notified to the index word canceling unit 16. A step S52 calculates the position of the specified index word by referring to the display document file 4, by the index word canceling unit 16. A step S53 changes the display of the index word portion which is being displayed by the display position controller 18 so that the display state becomes the same as the normal display state. A step S54 cancels the index word in the index information file 3 by the index word canceling unit 16, and the index word canceling process ends.

The steps S51, S52 and S54 are carried out by the index word canceling unit 16, and the step S53 is carried out by the document display controller 14.

Figure 9:
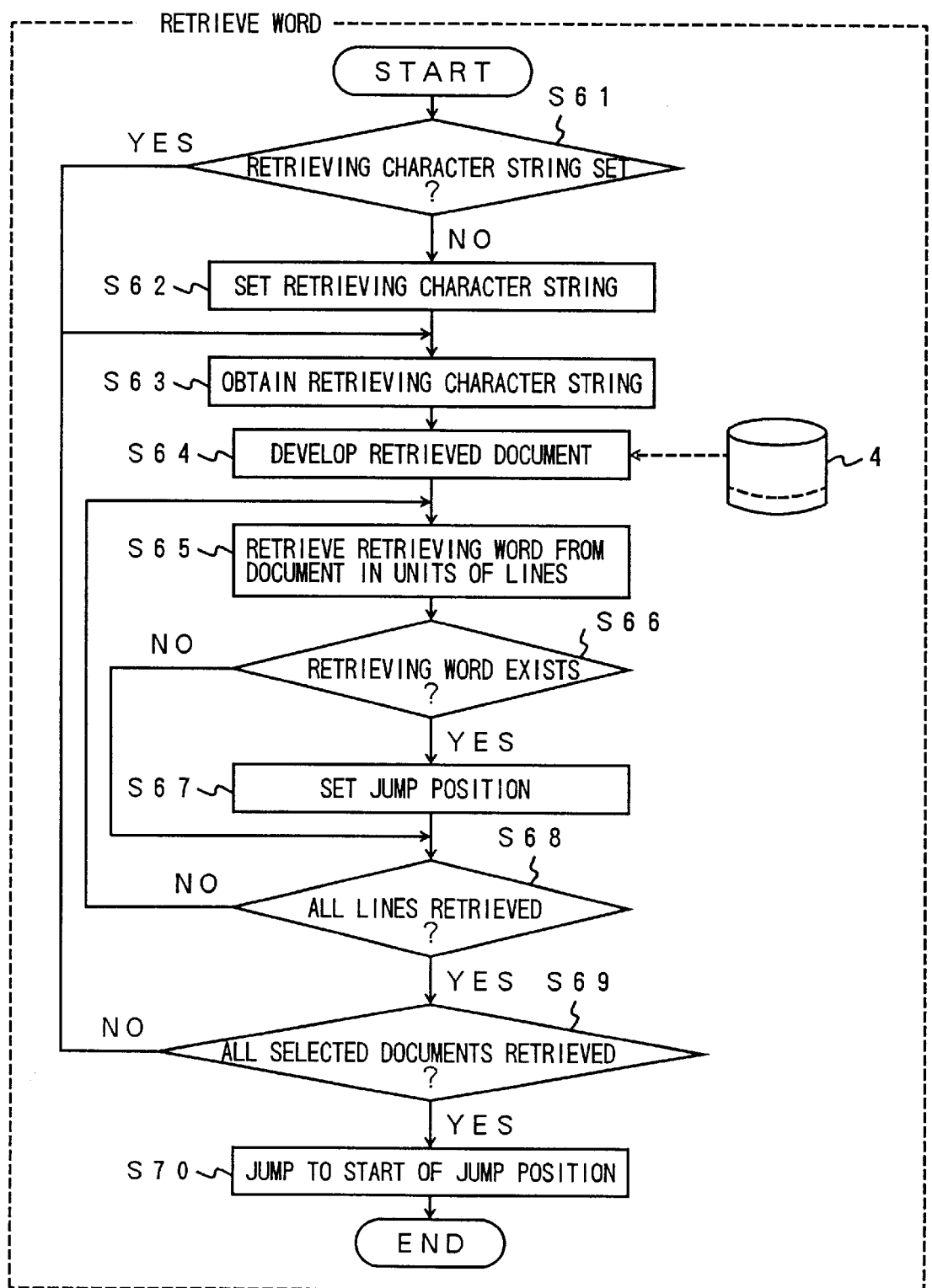
FIG. 9 is a flow chart for explaining a word retrieving process of the index creating apparatus.

(1-3) Word Retrieving Process:

FIG. 9 is a flow chart for explaining the word retrieving process. The process shown in FIG. 9 corresponds to the operations of the document display unit 14, the index word retrieving unit 17 and the display position controller 18 shown in FIG. 2.

In FIG. 9, a step S61 decides whether or not the retrieving character string is set, and the process advances to a step S63 if the decision result in the step S61 is YES. On the other hand, if the decision result in the step S61 is NO, a step S62 sets the retrieving character string in a region for setting the retrieving character string.

The step S63 carries out a process which obtains the retrieving character string. That is, the step S63 obtains the retrieving character string from the region in which the retrieving character string is set. A step S64 obtains from the display document file 4 a document with respect to which the word retrieving process is to be made, and develops the document in the memory 32.

A step S65 divides the retrieved document in units of lines and retrieves the retrieving words. A step S66 decides whether or not the retrieving word exists in the retrieved line, and the process advances to a step S67 if the decision result in the step S66 is YES. When the retrieving word exists, the step S67 sets the position where the retrieving word existed into a jump list.

On the other hand, the process advances to a step S68 if the decision result in the step S66 is NO. The step S68 decides whether or not all of the lines have been retrieved, and the process returns to the step S65 by setting a next line as the retrieving line so as to repeat the above described process if the decision result in the step S68 is NO. On the other hand, if the decision result in the step S68 is YES, the process advances to a step S69. The step S69 decides whether or not the word retrieving process has been carried out with respect to all of the selected documents. The process returns to repeat the above described process if the decision result in the step S69 is NO. But if the decision result in the step S69 is YES, the process advances to a step S70. The step S70 displays on the screen the document which is at the start of the jump position in the jump list, that is, at the position where the first index word is found, and the word retrieving process ends.

The steps S61, S63 and S65 through S69 are carried out by the index word retrieving unit 17, the steps S62 and S64 are carried out by the document display controller 14, and the step S70 is carried out by the display position controller 18.

Figure 10:
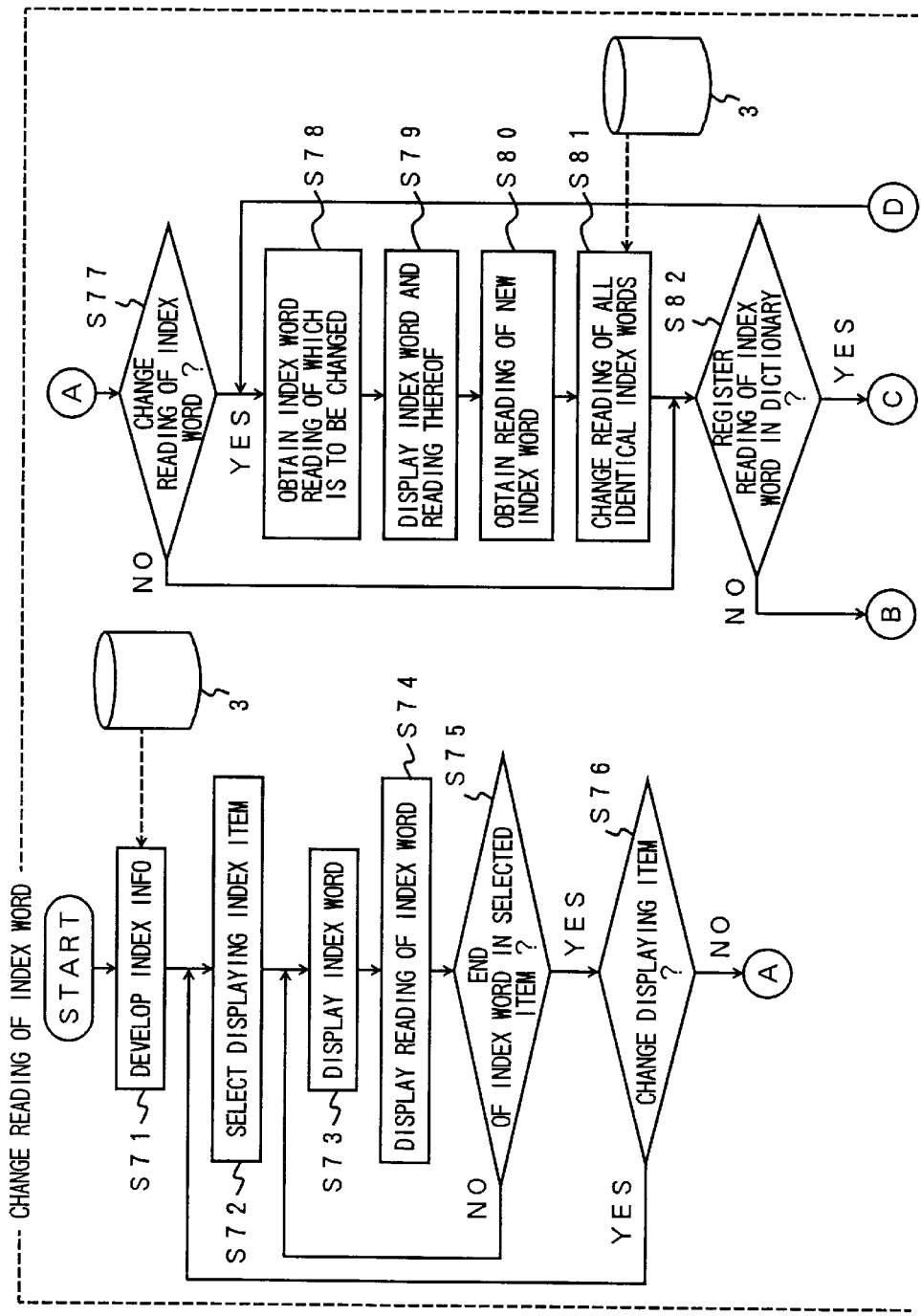
FIG. 10 is a flow chart for explaining a process which changes a reading of the index word in the index creating apparatus.
Figure 11:
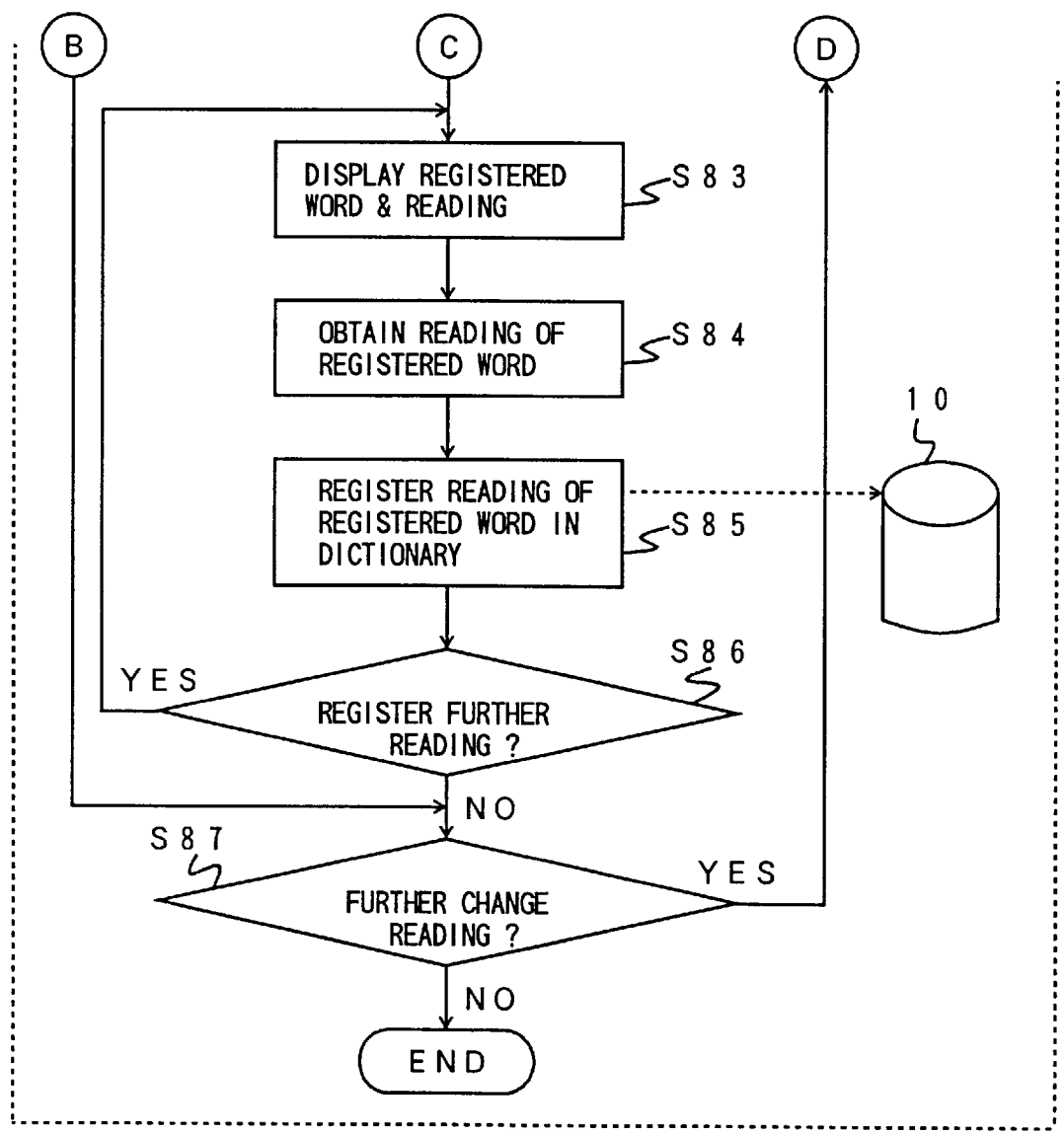
FIG. 11 is a flow chart for explaining the process which changes the reading of the index word in the index creating apparatus.

(1-4) Process Which Changes the Reading of the Index Word:

FIGS. 10 and 11 respectively are flow charts for explaining the process which changes the reading of the index word. The processes shown in FIGS. 10 and 11 correspond to the operations of the index word reading display controller 11, the index word reading dictionary registering unit 12 and the index word reading editor 13 shown in FIG. 2.

In FIG. 10, a step S71 develops information related to the index words from the index information file 3. In a step S72, the user selects a heading or title to be displayed. For example, the heading is an index item which is used when making a reference to an index such as "a", "b", . . . , Japanese hiragana characters and the like. The selected heading or title is notified to the index word reading display controller 11.

A step S73 displays the index words included under the heading (index item) which is selected by the user, one index word at a time. A step S74 displays each index word and its reading as a pair.

A step S75 decides whether or not the index words under the selected heading has ended. If all of the index words under the selected heading have been displayed and the decision result in the step S75 is YES, the process advances to a step S76. On the other hand, the process returns to the step S73 if the decision result in the step S75 is NO.

The step S76 decides whether or not the heading to be displayed is to be changed. The process returns to the step S72 if the decision result in the step S76 is YES. On the other hand, if the heading is not to be changed and the decision result in the step S76 is NO, the process advances to a step S77.

The step S77 decides whether or not to change the reading of the index word. The process advances to a step S78 if the decision result in the step S77 is YES, but the process advances to a step S82 if the decision result in the step S77 is NO. In the step S78, the user selects the displayed index word the reading of which is to be changed. A step S79 displays the index word selected by the user and the reading of this index word as a pair.

A step S80 obtains a new reading of the index word input by the user. A step S81 replaces the reading in the index information file 3 by the new reading which is input by the user.

The step S82 decides whether or not to register the reading of the index word into the index word reading dictionary 10. If the decision result in the step S82 is NO, the process advances to a step S87 shown in FIG. 11. On the other hand, if the decision result in the step S82 is YES, the process advances to a step S83 shown in FIG. 11.

The step S83 displays the registered word and its reading, and a step S84 obtains the reading of the registered word from an input made by the user. A step S85 registers the pair made up of the registered word and its reading into the index word reading dictionary 10.

A step S86 decides whether or not a further reading is to be registered, and the process returns to the step S83 to repeat the above described process if the decision result in the step S86 is YES. On the other hand, if the decision result in the step S86 is NO, the step S87 decides whether or not the reading is to be further changed. The process returns to the step S78 shown in FIG. 10 to repeat the above described process if the decision result in the step S87 is YES.

But the process which changes the reading of the index word ends if the decision result in the step S87 is NO.

The steps S71 and S72 are carried out by the index word reading display controller 11, the steps S73 through S80, S83, S84, S86 and S87 are carried out by the index word reading editor 13, and the steps S81, S82 and S85 are carried out by the index word reading dictionary registering unit 12.

(1-5) Index List Display Process:

FIGS. 12 through 17 respectively are flow charts for explaining the index list display process.

Figure 14:
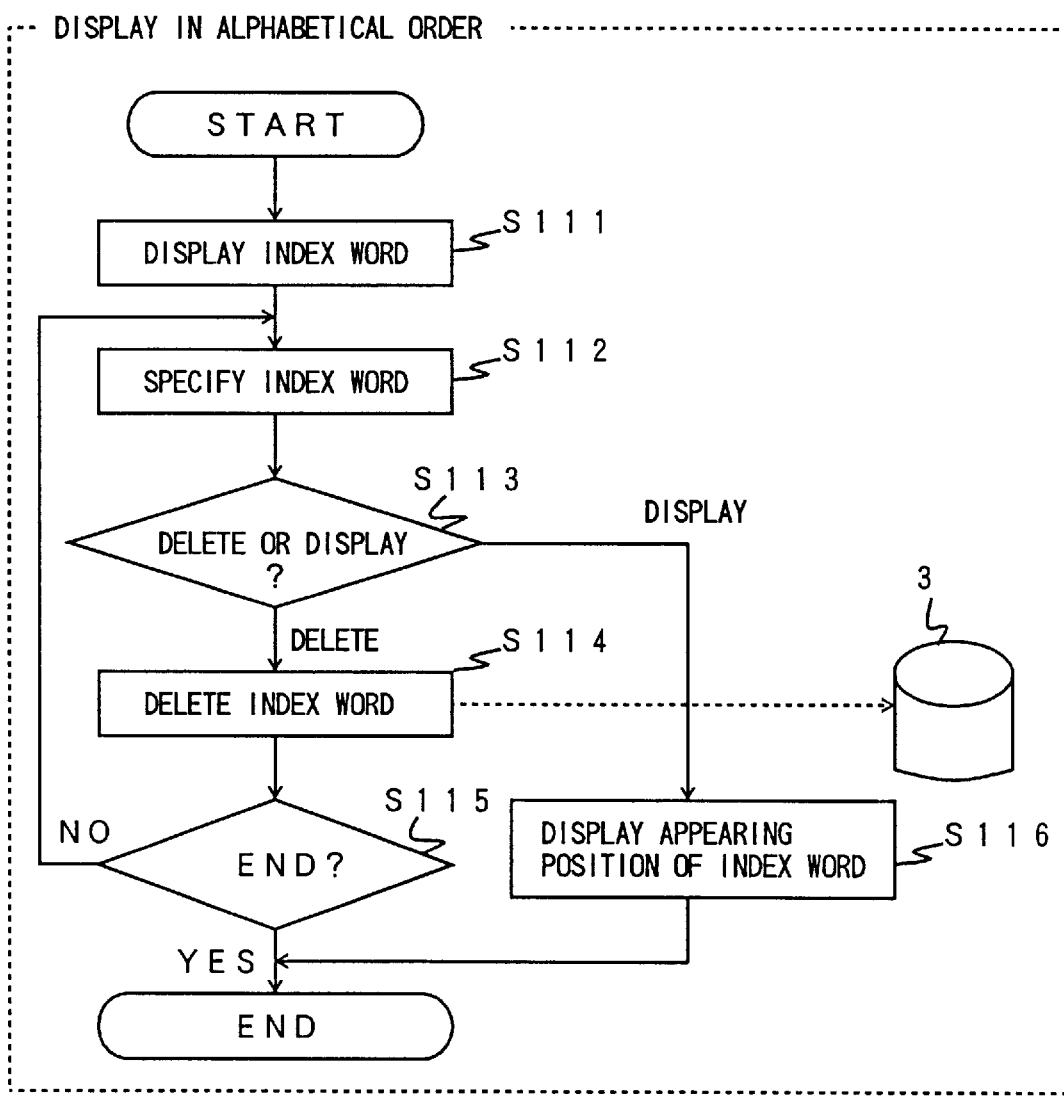
FIG. 14 is a flow chart for explaining the index list display process of the embodiment of the index creating apparatus.
Figure 15:
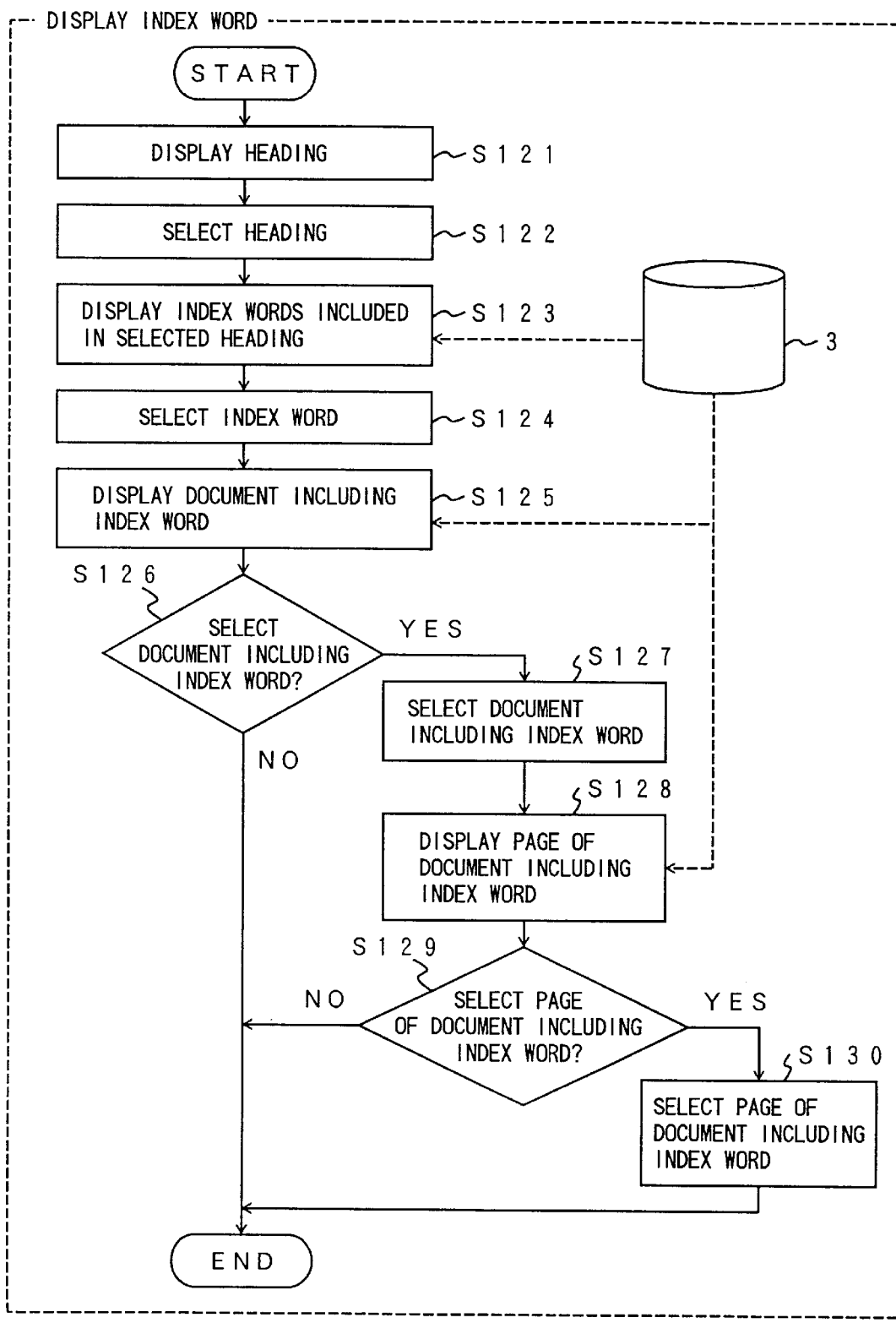
FIG. 15 is a flow chart for explaining an index word display process of the index creating apparatus.
Figure 16:
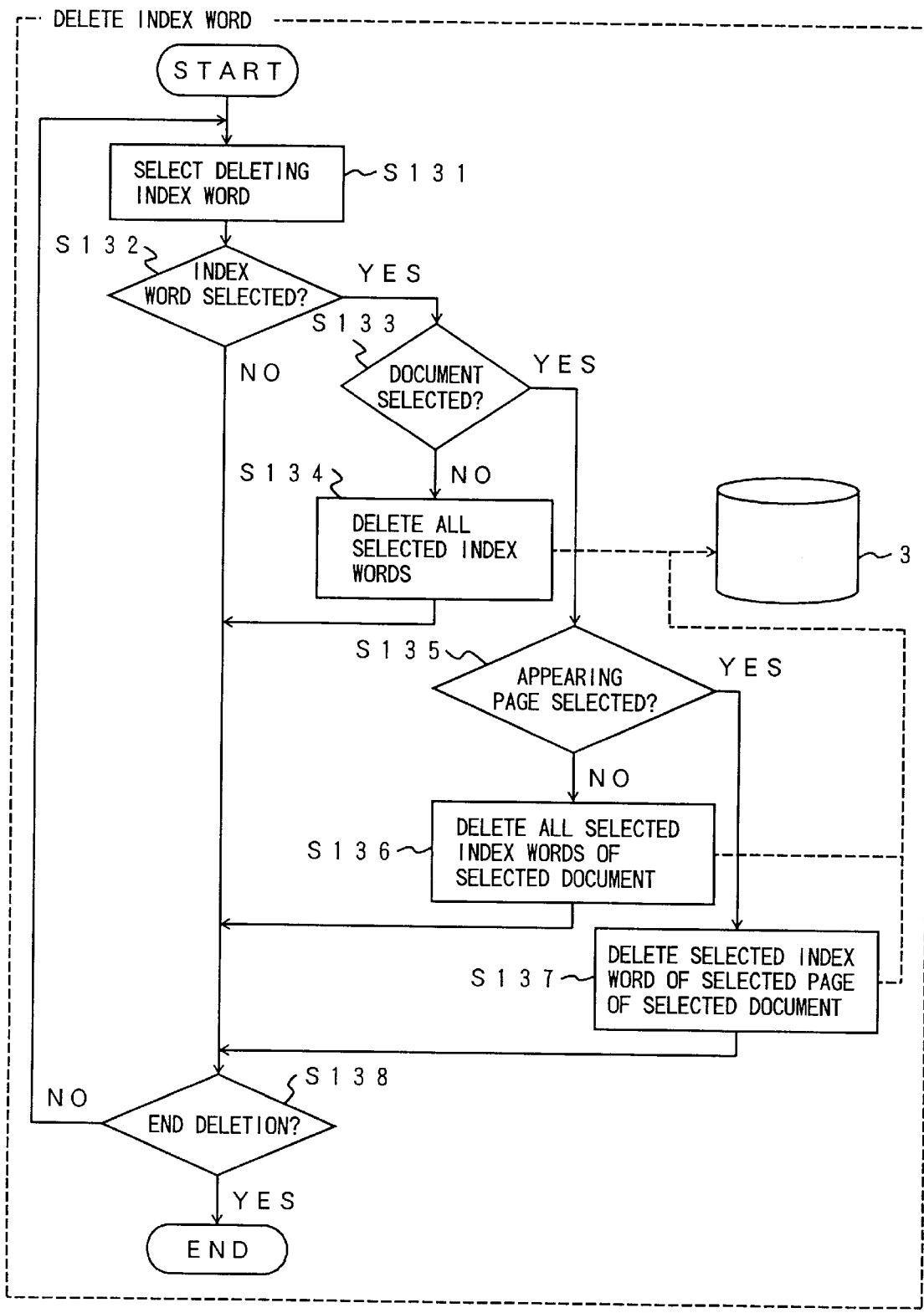
FIG. 16 is a flow chart for explaining an index word deleting process of the index creating apparatus.
Figure 17:
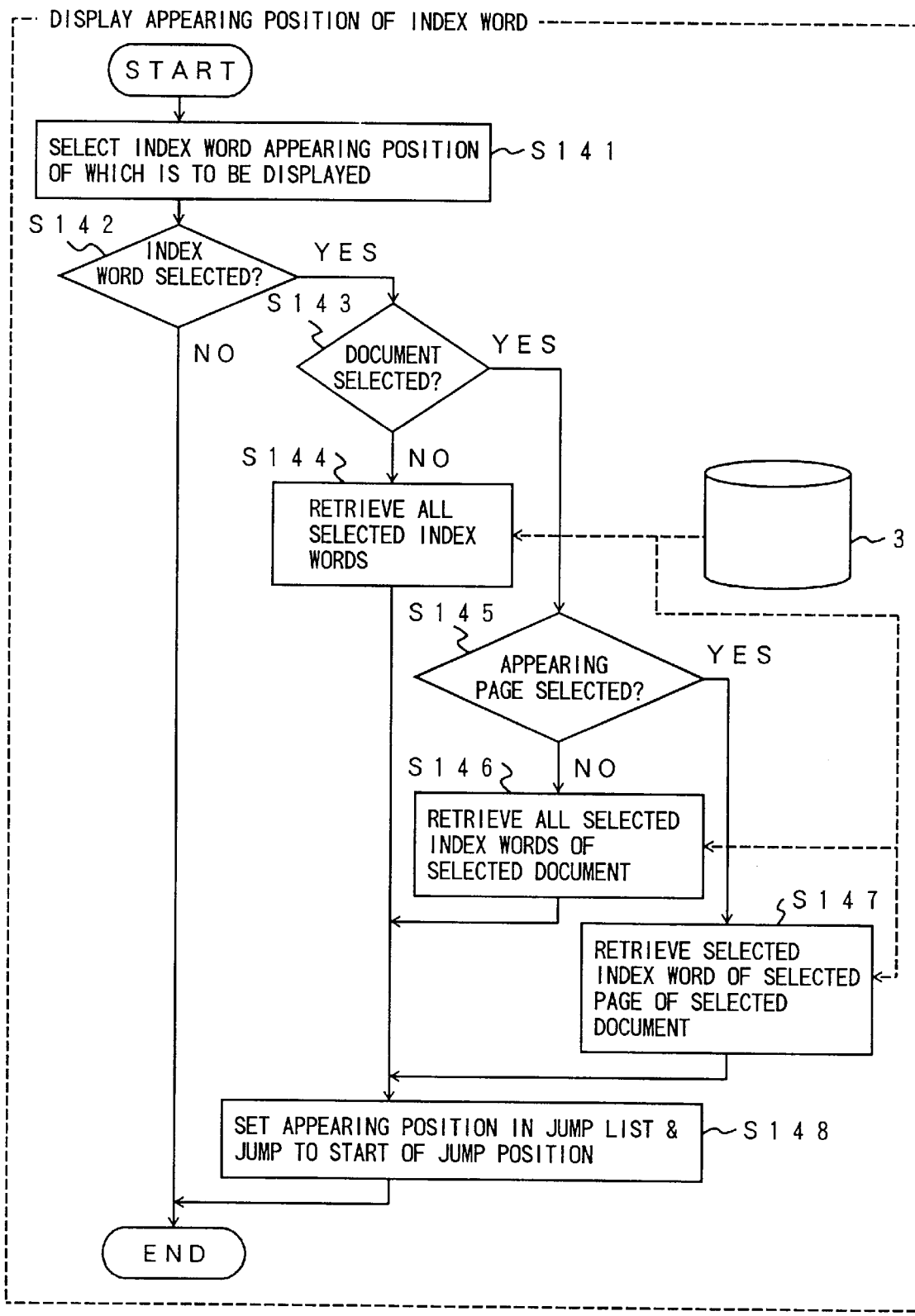
FIG. 17 is a flow chart for explaining a process which displays appearing positions of the index words in the index creating apparatus.

The processes shown in FIGS. 12 through 15 correspond to the operations of the index word list display controller 19 shown in FIG. 2, the process shown in FIG. 16 corresponds to the operation of the index word deleting unit 21 shown in FIG. 2, and the process shown in FIG. 17 corresponds to the operations of the display position controller 18, the index word list display controller 19 and the index word appearing position display controller 20 shown in FIG. 2.

Figure 12:
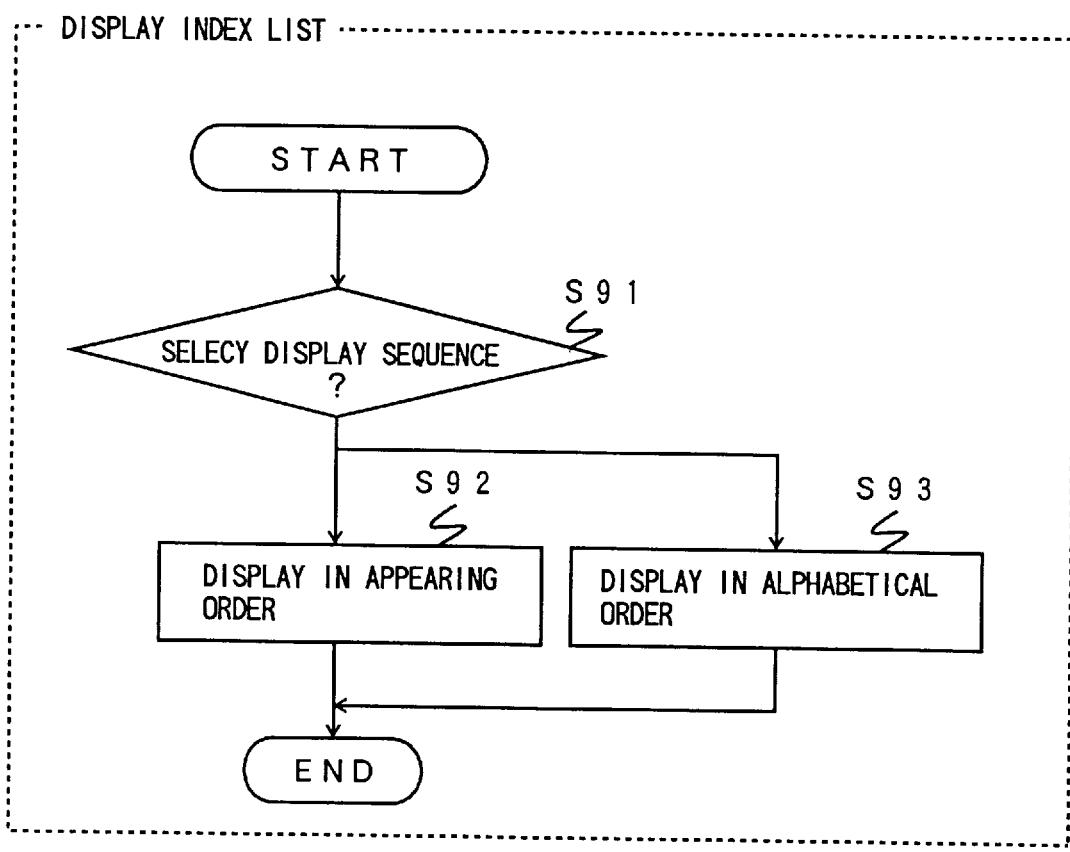
FIG. 12 is a flow chart for explaining an index list display process of the index creating apparatus.

In FIG. 12, a step S91 selects a display sequence or order. If the display is to be made in the appearing order, the process advances to a step S92 so as to carry out a process shown in FIG. 13. On the other hand, if the display is to be made in the alphabetical order (or in the order of the Japanese kana syllabary), for example, the process advances to a step S93 so as to carry out a process shown in FIG. 14.

Figure 13:
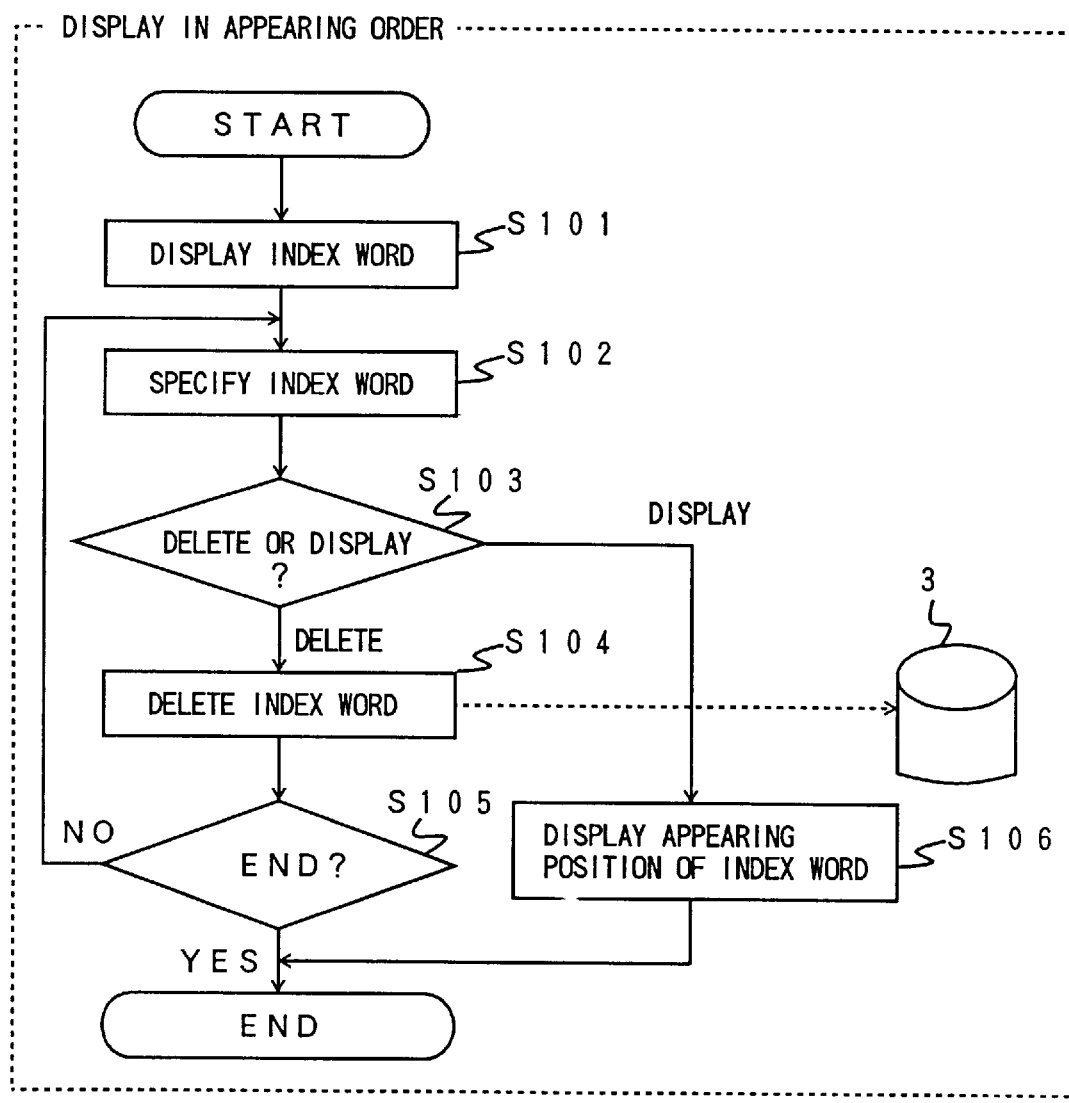
FIG. 13 is a flow chart for explaining the index list display process of the index creating apparatus.

When making the display in the appearing order, a step S101 shown in FIG. 13 displays the index words in sequence. The user specifies the index word to be processed in a step S102. A step S103 decides whether the index word is to be deleted or is to be displayed at the appearing position.

If the index word is to be deleted, the process advances to a step S104 which deletes the index word from the index information file 3. Then, a step S105 decides whether or not the process which displays the index words in the appearing order is to be ended. If the decision result in the step S105 is NO, the process returns to the step S102 to repeat the above described process. On the other hand, if the appearing position of the index word is to be displayed, a step S106 displays the appearing position of the index word within the document together with the index word list. In addition, the step S106 sets the appearing position of the index word at the jump position, and the process which displays the index words in the appearing order ends.

On the other hand, when displaying the index words in the alphabetical order, a step S111 shown in FIG. 14 displays the index words in the alphabetical order, and steps S112 through S116 are carried out similarly to the steps S102 through S106 shown in FIG. 13. In other words, the user specifies the index word to be processed in the step S112. The step S113 decides whether the index word is to be deleted or is to be displayed at the appearing position.

If the index word is to be deleted, the process advances to the step S114 which deletes the index word from the index information file 3. Then, the step S115 decides whether or not the process which displays the index words in the alphabetical order is to be ended. If the decision result in the step S115 is NO, the process returns to the step S112 to repeat the above described process. On the other hand, if the appearing position of the index word is to be displayed, the step S116 displays the appearing position of the index word within the document together with the index word list. In addition, the step S116 sets the appearing position of the index word at the jump position, and the process which displays the index words in the alphabetical order ends.

FIG. 15 is a flow chart for explaining the process which displays the index words in the step S101 shown in FIG. 13 or the step S111 shown in FIG. 14.

In FIG. 15, if the displaying sequence is the appearing order, a step S121 displays the headings of the appearing order. On the other hand, if the displaying sequence is the alphabetical order, the step S121 displays the headings of the alphabetical order.

The user selects the heading in a step S122, and a step S123 retrieves the index words which are included in the selected heading from the index information file 3, and displays the retrieved index words. The user selects the index word to be displayed in a step S124, and a step S125 displays a document which includes the selected index word based on the selection made in the step S124.

A step S126 decides whether or not the user has specified that the user will select the displayed document which includes the selected index word, and the process ends if the decision result in the step S126 is NO. On the other hand, if the decision result in the step S126 is YES, the process advances to a step S127.

In the step S127, the user selects the displayed document which includes the selected index word. A step S128 displays the appearing page of the index word which is included in the document selected by the user, for each of the displayed index words. A step S129 decides whether or not the user has specified that the page of the document which includes the index word will be selected by the user. If the decision result in the step S129 is YES, the user selects the page of the document which includes the index word in a step S130, and the process which displays the index words ends. The process which displays the index words also ends if the decision result in the step S129 is NO.

FIG. 16 is a flow chart for explaining the index word deleting process shown in the step S104 shown in FIG. 13 or the step S114 shown in FIG. 14.

In a step S131 shown in FIG. 16, the user selects the index word which is to be deleted out of the displayed index words. A step S132 decides whether or not the index word which is to be deleted has been selected, and the process advances to a step S138 if the decision result in the step S132 is NO. On the other hand, if the decision result in the step S132 is YES, a step S133 selects whether or not the document has been selected. If the index word which is to be detected has been selected but the document in which this selected index word appears has not been selected, the decision result in the step S133 is NO and the process advances to a step S134. The process advances to a step S135 if the decision result in the step S133 is YES.

The step S134 deletes all of the selected index words which are to be deleted from the index information file 3, and the process advances to the step S138. On the other hand, the step S135 decides whether or not the appearing page has been selected. If the decision result in the step S135 is NO, a step S136 deletes all of the index words of the selected document, and the process advances to the step S138.

If the appearing page has been selected, the decision result in the step S135 is. YES. In this case, a step S137 deletes the selected index word in the selected page of the selected document, and the process advances to the step S138.

The step S138 decides whether or not the index word deleting process is to be ended. If the decision result in the step S138 is NO, the process returns to the step S131 so as to repeat the above described process. The index word deleting process ends if the decision result in the step S138 is YES.

FIG. 17 is a flow chart for explaining the process of displaying the appearing position of the index word in the step S106 shown in FIG. 13 or the step S116 shown in FIG. 14.

In a step S141 shown in FIG. 17, the user selects the index word the appearing position of which is to be displayed. A step S142 decides whether or not the index word has been selected, and the process ends if the decision result in the step S142 is NO. On the other hand, if the decision result in the step S142 is YES, the process advances to a step S143. The step S143 decides whether or not the document has been selected.

If the index word has been selected but the document in which this index word appears has not been selected, the decision result in the step S143 is NO. In this case, a step S144 retrieves all of the selected index words from the index information file 3, and the process advances to a step S148.

On the other hand, if the decision result in the step S143 is YES, a step S145 decides whether or not the appearing page has been selected. If the decision result in the step S145 is NO, a step S146 retrieves all of the index words of the selected document, and the process advances to the step S148. But if the decision result in the step S145 is YES, a step S147 retrieves the selected index word in the selected page of the selected document, and the process advances to the step S148.

The step S148 sets the appearing position in the jump list and jumps to the start of the jump position, and the process which displays the appearing position of the index word ends.

The steps S141 through S143 and S145 are carried out by the index word list display controller 19, the steps S144, S146 and S147 are carried out by the index word appearing position display controller 20, and the step S148 is carried out by the display position controller 18.

Figure 18:
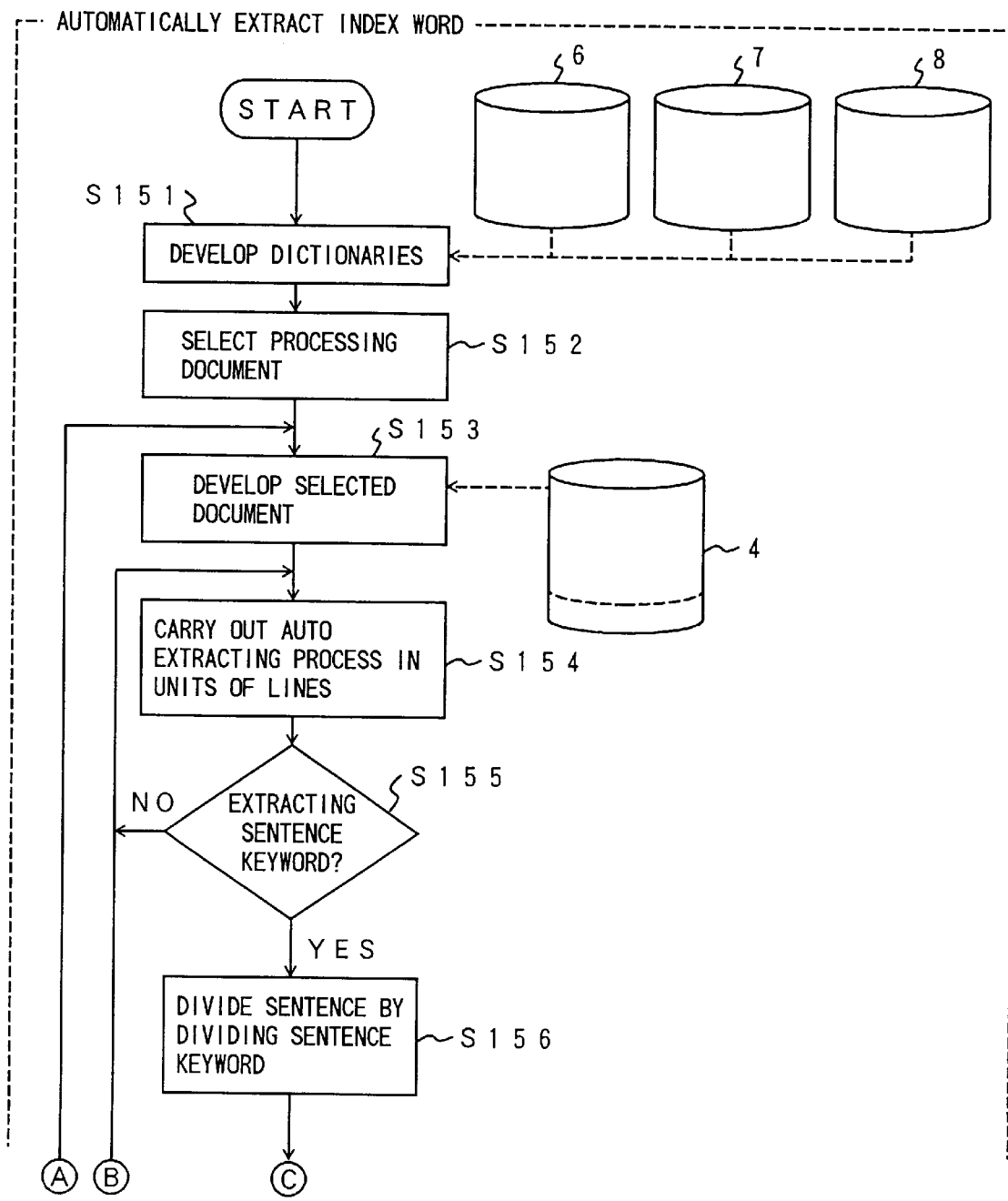
FIG. 18 is a flow chart for explaining a process which automatically extracts the index words in the index creating apparatus.
Figure 19:
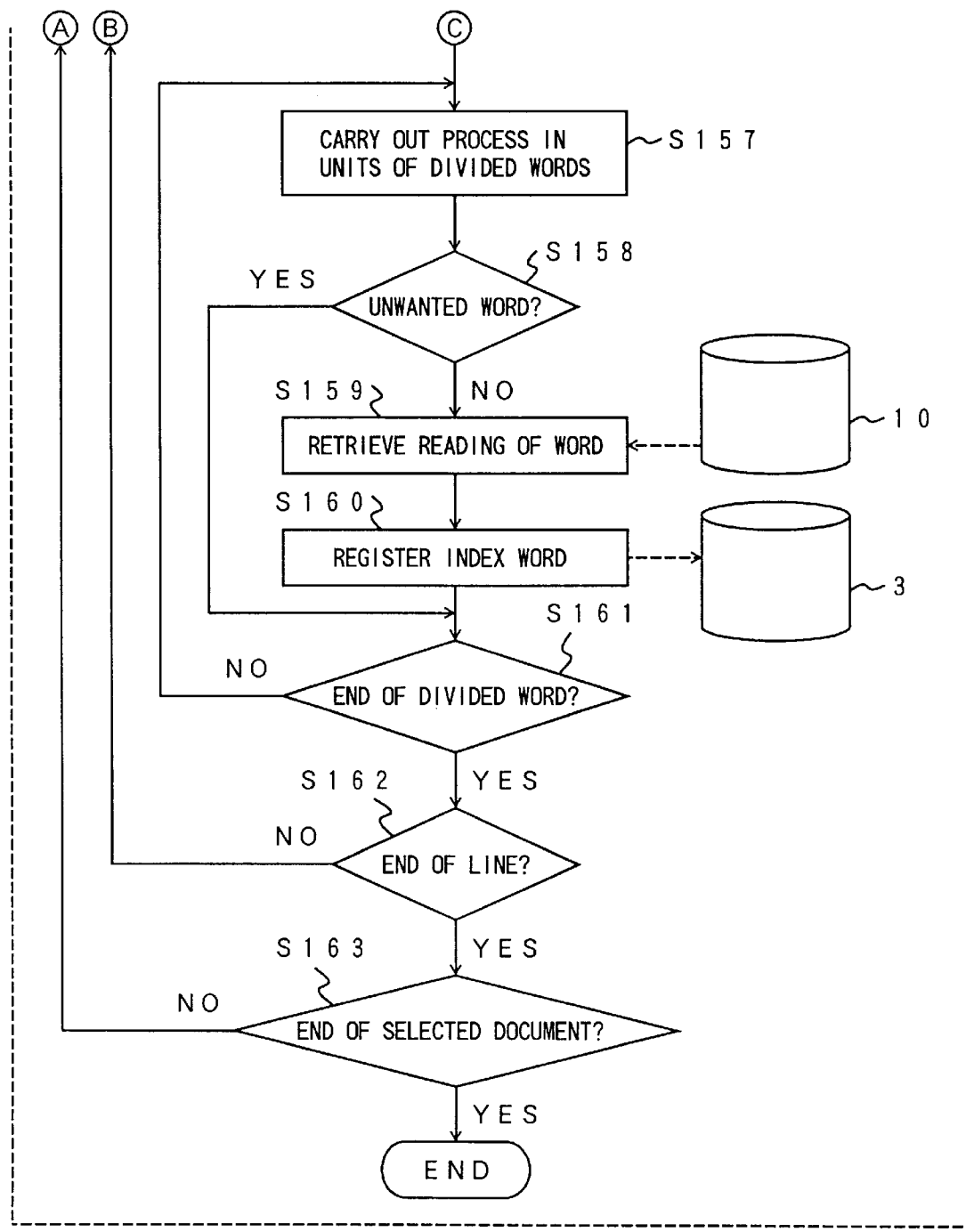
FIG. 19 is a flow chart for explaining the process which automatically extracts the index words in the index creating apparatus.

(1-6) Process Which Automatically Extracts the Index Words:

FIGS. 18 and 19 respectively are flow charts for explaining the process which automatically extracts the index words. Particular examples of this process which automatically extracts the index words will be described later. The processes shown in FIGS. 18 and 19 correspond to the operation of the index word automatic extracting unit 5 shown in FIG. 2.

A step S151 shown in FIG. 18 develops the contents of the extracting sentence keyword dictionary 6, the sentence dividing keyword dictionary 7 and the unwanted word deleting dictionary 8 in the memory 32, and the contents of these dictionaries are converted into internal data which are retrievable. In a step S152, the user selects the document from which the index words are to be automatically extracted.

A step S153 sequentially develops the documents selected from the display document file 4 into the memory 32. A step S154 obtains the lines of the selected document from the memory 32 1 line at a time to carry out an automatic extracting process.

In other words, a step S155 decides whether or not the sentence which is to be processed includes an extracting sentence keyword in the extracting sentence keyword dictionary 6. If the decision result in the step S155 is YES, the process advances to a step S156. The step S156 divides the sentence which is to be processed by the words included in the dividing sentence keyword dictionary 7. On the other hand, the process returns to the step S154 if the decision result in the step S155 is NO.

After the step S156, a step S157 shown in FIG. 19 obtains the divided words 1 word at a time, so as to process the same. A step S158 decides whether or not the word to be processed matches a word included in the unwanted word deleting dictionary 8.

The process advances to a step S159 if the decision result in the step S158 is NO, but the process advances to a step S161 if the decision result in the step S158 is YES.

The step S159 retrieves the index word reading dictionary 10 and obtains the reading of the word which is to be processed. A step S160 forms a pair from the word which is to be processed and the reading of this word, and registers this pair into the index information file 3.

The step S161 decides whether or not the divided words have ended. If all of the divided words have been processed and the decision result in the step S161 is YES, the process advances to a step S162. On the other hand, the process returns to the step S157 to repeat the above described process if the decision result in the step S161 is NO.

The step S162 decides whether or not the lines have ended. If all of the lines have been processed and the decision result in the step S162 is YES, the process advances to a step S163. The process returns to the step S154 shown in FIG. 18 to repeat the above described process if the decision result in the step S162 is NO.

The step S163 decides whether or not the processing of the selected document has ended. The process which automatically extracts the index words ends if the decision result in the step S163 is YES. On the other hand, the process returns to the step S153 shown in FIG. 18 to repeat the above described process if the decision result in the step S163 is NO.

Figure 20:
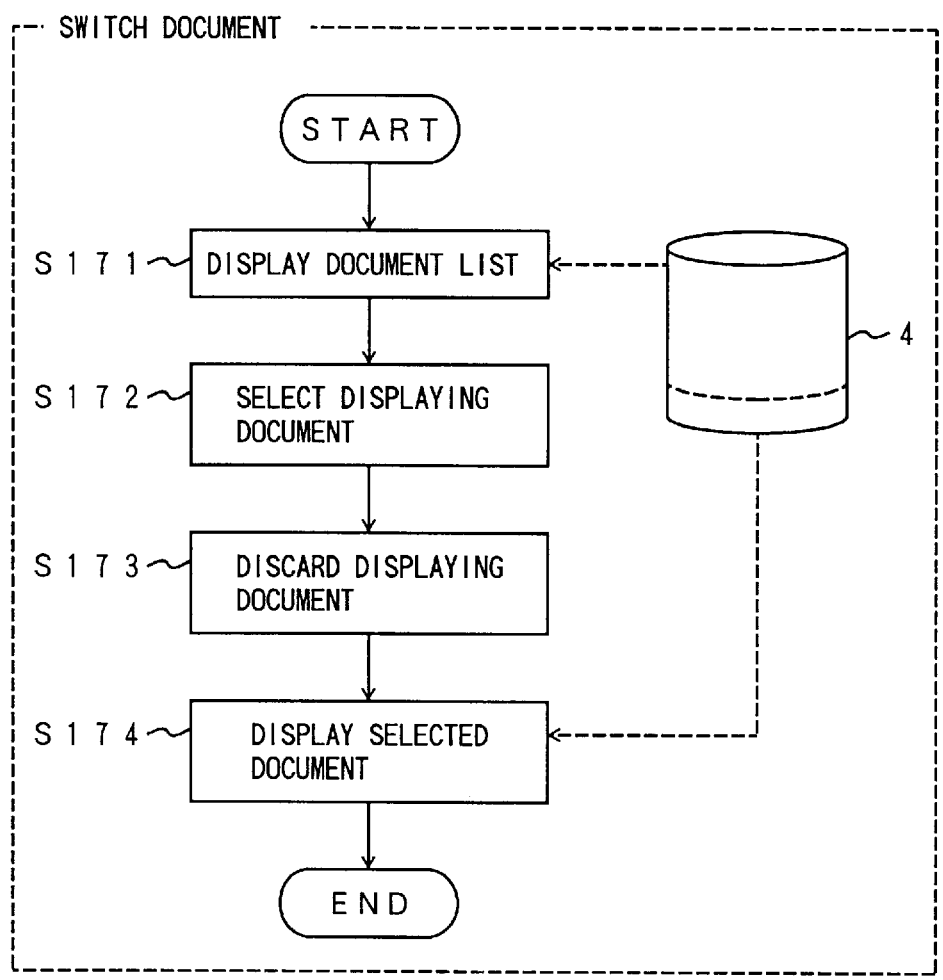
FIG. 20 is a flow chart for explaining a document switching process of the index creating apparatus.

(1-7) Document Switching Process:

FIG. 20 is a flow chart for explaining the document switching process. The process shown in FIG. 20 corresponds to the operation of the document display controller 14 shown in FIG. 2.

In FIG. 20, a step S171 creates a document list of all documents read from the display document file 4 and displays this list. In a step S172, the user selects the document to be displayed from the document list. A step S173 discards the document which was displayed before the document selection in the step S172. A step S174 obtains the selected document from the display document file 4 and displays the selected document, and the document switching process ends.

Figure 21:
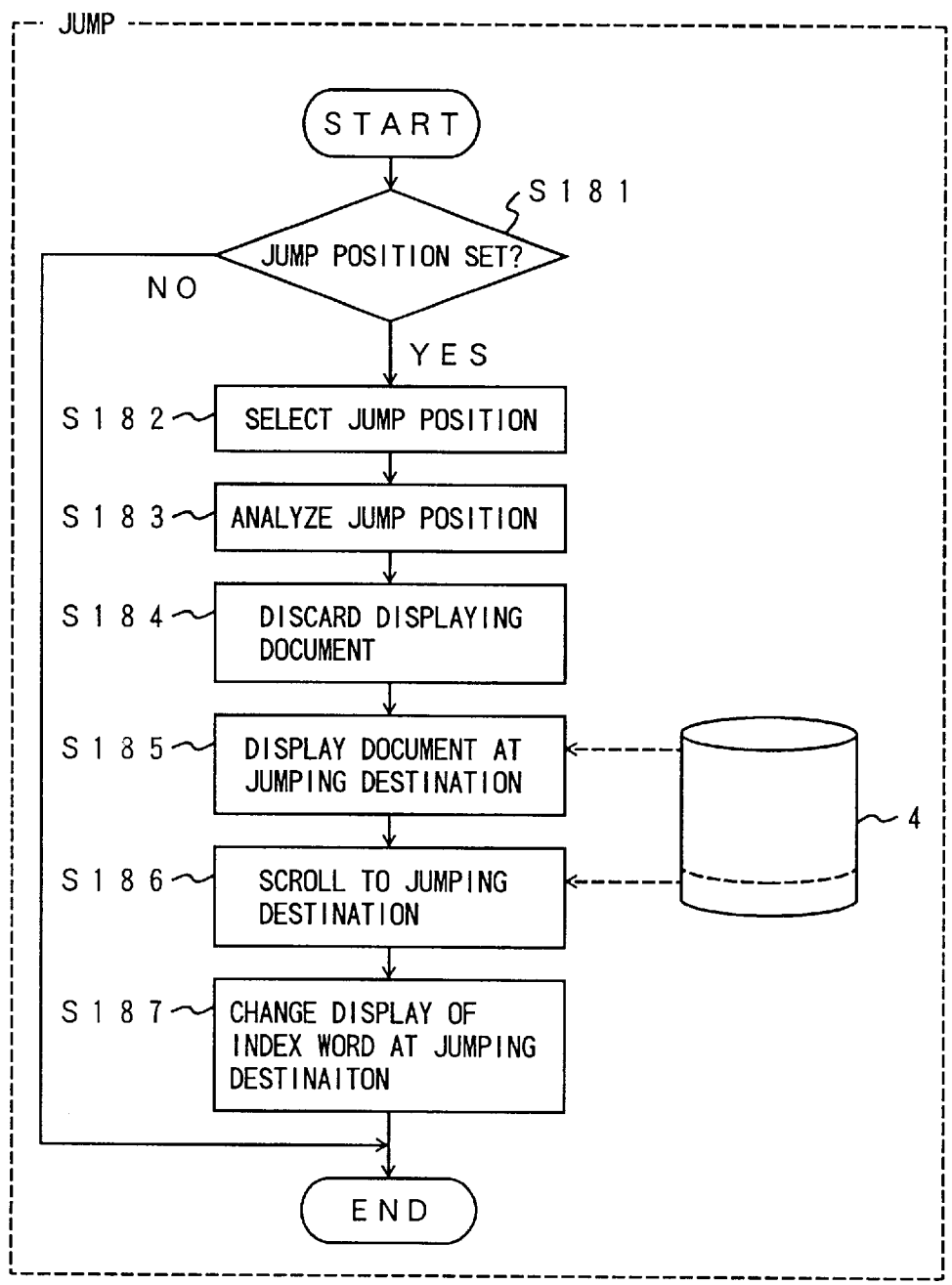
FIG. 21 is a flow chart for explaining a jump process of the index creating apparatus.

(1-8) Jump Process:

FIG. 21 is a flow chart for explaining the jump process. The process shown in FIG. 21 corresponds to the operations of the document display controller 14 and the display position controller 18 shown in FIG. 2.

In FIG. 21, a step S181 decides whether or not the jump position has been set, and the process advances to a step S182 if the decision result in the step S181 is YES. The jump process ends if the decision result in the step S181 is NO.

In the step S182, the user selects the jump position. A step S183 analyzes the selected jump position and obtains the position to which the jump is to be made from the selected jump position. A step S184 discards the document which was being displayed when the jump position was selected. A step S185 reads the document at the destination of the jump from the display document file 4, and displays this document. A step S186 scrolls the displayed document up to the destination of the jump. A step S187 changes the display of the index word portion of the displayed document, and the jump process ends.

The steps S181 through S184 are carried out by the display position controller 18, and the steps S185 through S187 are carried out by the document display controller 14.

(2) Process Which Fills the Format of the Index Word:

FIG. 22 is a diagram showing a document filled with the format of the index word. In FIG. 22, a (white) star mark indicates the start of the normal index word, a black star mark indicates the start of the important index word, a (white) diamond mark indicates the end of the index word, and a portion between 2 (white) triangular marks indicate the reading of the index word.

The index word format filling unit 22 shown in FIG. 2 refers to the index information file 3 and reads the index words and their reading, and creates from the display document file 4 a document which is filled with the format of the index words. This document which is created by the index word format filling unit 22 is output as the output document of the output document file 23.

Figure 23B:
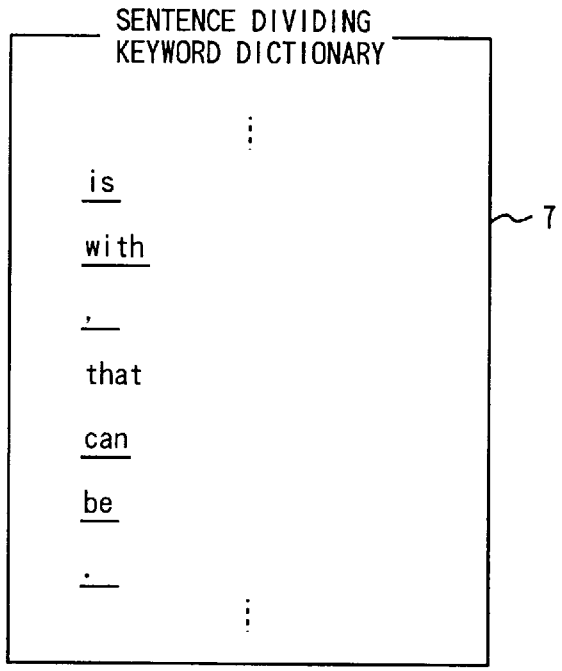
Figure 23C:
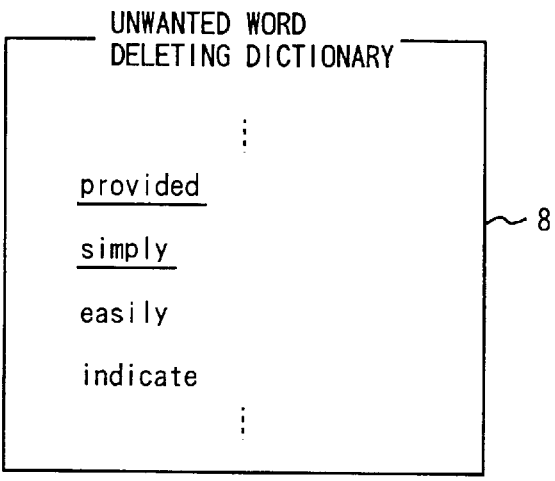

(3) Particular Examples of the Automatic Extraction of the Index Words:

FIG. 23A shows keywords registered in the extracting sentence keyword dictionary 6, FIG. 23B shows keywords registered in the sentence dividing keyword dictionary 7, and FIG. 23C shows unwanted words registered in the unwanted word deleting dictionary 8. A description will now be given of the automatic extraction of the index words with respect to the document shown in FIG. 22. In this particular case, the example of the sentence reads: "An index creating apparatus is provided with a function of automatically extracting index words, and the index words can simply be specified." in Japanese.

(i) If the input sentence includes the word in the extracting sentence keyword dictionary 6, the index word is extracted from this input sentence.

In the above example of the sentence, the word "can" in the input sentence is included in the extracting sentence keyword dictionary 6 as shown in FIG. 23A. Hence, the index word is extracted from this input sentence as indicated in the following by an underline.

"An index creating apparatus is provided with a function of automatically extracting index words, and the index words can simply be specified."

(ii) The input sentence is divided by the words in the sentence dividing keyword dictionary 7.

In the above example of the sentence, the input sentence is divided by the words "is", "with", ",", "can", "be" and "." in the sentence dividing keyword dictionary 7 shown in FIG. 23B as indicated in the following by an underline.

"An index creating apparatus is provided with a function of automatically extracting index words, and the index words can simply be specified."

(iii) The words which are divided in the input sentence and the words in the unwanted word deleting dictionary 8 are compared, and the matching word is deleted.

In the above example of the sentence, the divided words "provided" and "simply" in the input sentence match the words "provided" and "simply" in the unwanted word deleting dictionary 8 shown in FIG. 23C, and these matching words are deleted. As a result, the words "An index creating apparatus", "a function of automatically extracting index words", and "and the index words specified" remain.

(iv) The remaining words are used as the index words.

In the above example of the sentence, the words "An index creating apparatus", "a function of automatically extracting index words", and "and the index words specified" are regarded as the index words.

Figures 24, 25:
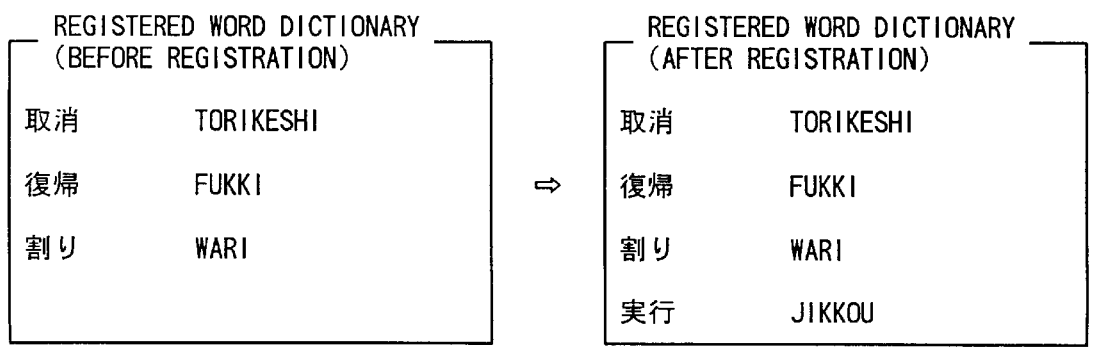
FIG. 24 is a diagram showing registered contents of an index word reading dictionary.
FIG. 25 is a diagram showing the registered contents of the index word reading dictionary.

(4) Obtaining/Registering the Reading of the Index Words:

FIG. 24 is a diagram showing registered contents of the index word reading dictionary 10. As shown in FIG. 24, the index word reading dictionary 10 is made up of 2 kinds of data.

For example, if the language being processed is Japanese, the 2 kinds of data respectively form a Japan Industry Standard (JIS) first level word dictionary and a registered word dictionary. The JIS first level word dictionary stores the range of the character codes and the Japanese on-yomi reading thereof. There are more than 1 Kanji character which is pronounced the same, and in FIG. 24, 2 Kanji characters are shown as having the same reading (pronunciation) in the JIS first level word dictionary. On the other hand, the registered word dictionary stores the words and their reading. When the user registers a word in the registered word dictionary, the reading of this word is registered in the registered word dictionary. A combination of Kanji characters or a combination of one or more Kanji characters and one or more Hiragana characters may make up a word, and FIG. 24 shows 3 such combinations in the registered word dictionary.

In the index word specifying process described above, the reading of the index word is retrieved from the index word reading dictionary 10, and the reading of the index word is registered in the index information file 3. In addition, in the process which changes the reading of the index word, the reading of the registered word which is obtained is registered in the index word reading dictionary 10.

In the process which automatically extracts the index word, the reading of the word is obtained by referring to the index word reading dictionary 10, and the obtained reading of the word is registered in the index information file 3.

Next, a description will be given of a method of obtaining and registering the reading of the index word using the index word reading dictionary 10.

(I) Method of Obtaining the Reading of the Index Word:

The length of the index word is shortened by removing the characters from the end of the index word 1 character (syllable or Japanese kana syllabary) at a time. Whenever the index word with the reduced length matches a character string which is registered in the index word reading dictionary 10, the reading of the index word with the reduced length (character string) is obtained from the index word reading dictionary 10, and the matching character string is erased. The retrieval of the reading of the index word is continued by further reducing the length of the index word by removing the characters from the end of the index word 1 character at a time. If no match is found after the length of the index word is shortened to 1 character, the reading is set to the reading of the default, such as "*".

For example, assume that the reading of the Japanese characters which are pronounced "TORI KESHI JOU no CHU I" is to be obtained, where the capital letters in parenthesis denote 1 Kanji character and the small letters in parenthesis denote 1 Hiragana character. This character string pronounced "TORI KESHI JOU no CHU I" means "warning when making the deletion" in English. The length of the character string "TORI KESHI JOU no CHU I" is reduced 1 character at a time from the end of the character string, and the retrieval is successively made for the shortened character strings "TORI KESHI JOU no CHU", "TORI KESHI JOU no", "TORI KESHI JOU" and "TORI KESHI". If the reading of "TORI KESHI" exists in the registered word dictionary as shown in FIG. 24, the reading of this character string is regarded as 'tori keshi'. Thereafter, the characters "TORI KESHI" are deleted from the character string "TORI KESHI JOU no CHU I", and the reading of "JOU no CHU I" is retrieved. The length of this character string "JOU no CHU I" is reduced similarly as described above by removing 1 character at a time from the end of this character string. As a result, it is found that the character "JOU" is registered in the JIS first level word dictionary, and the reading 'jou' of this character is added to the reading 'tori keshi' described above, and the reading 'tori keshi jou' is obtained.

Then, the character "JOU" is deleted, and the reading of "no CHU I" is retrieved similarly as described above. The length of the character string "no CHU I" is shortened by removing 1 character at a time from the end of this character string, and the character "no" is obtained. This character "NO" is added to the reading 'tori keshi jou' described above, and the reading 'tori keshi jou no' is obtained.

The reading 'tori keshi jou no chu i' of the entire character string is obtained by repeating the above described process.

(II) Registering the Reading of the Index Word:

When registering the reading of the index word, the index word and its reading are registered as a pair in the registered word dictionary of the index word reading dictionary 10 as described above.

For example, if the Kanji character string "JITSU KOU" and its reading 'jitsu kou' are registered as a pair, the registered word dictionary becomes as shown in FIG. 25 after the registration of the pair.

Figure 26:
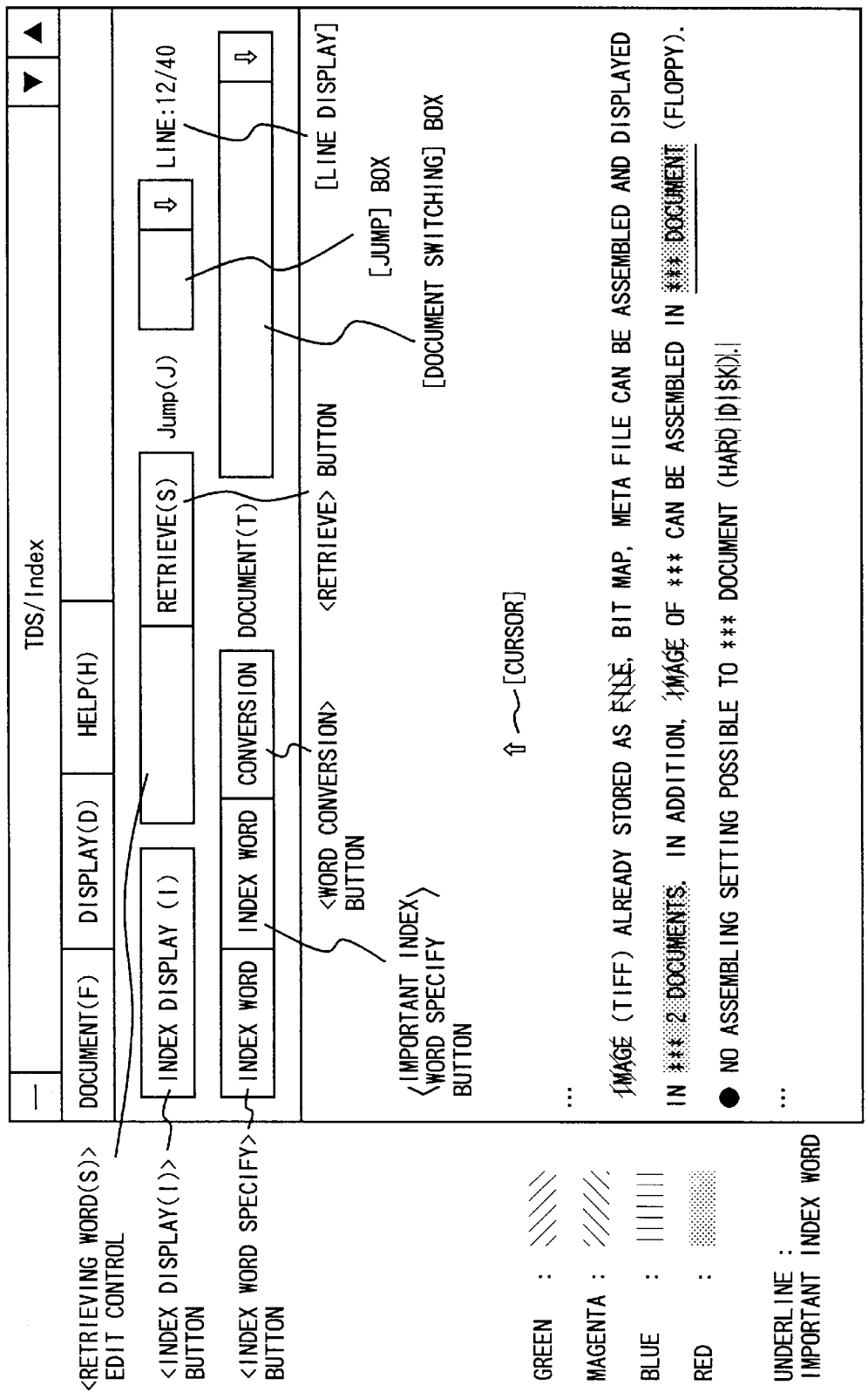
FIG. 26 is a diagram showing a display screen of the index creating apparatus.
Figure 28:
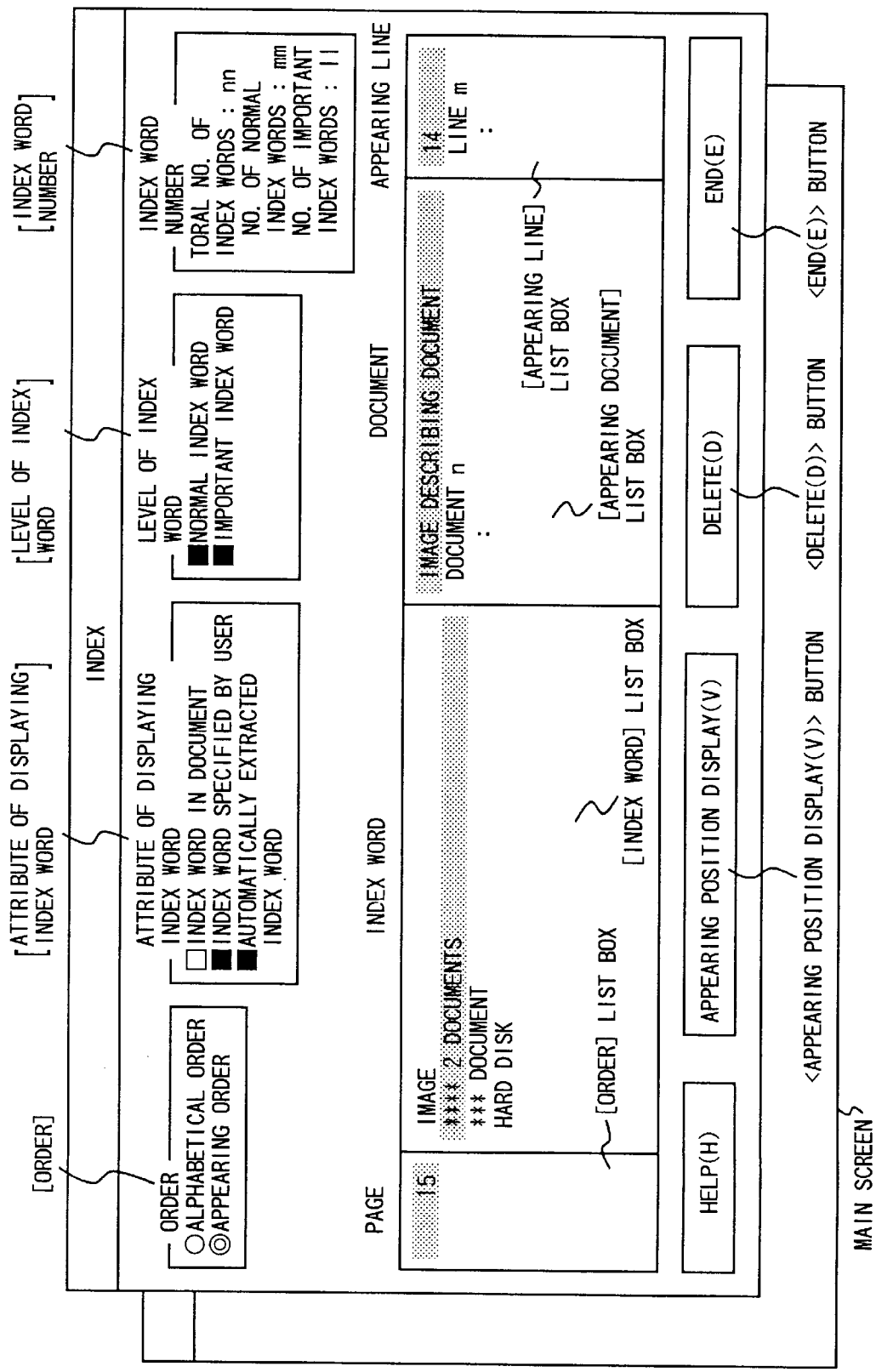
FIG. 28 is a diagram showing the display screen of the index creating apparatus.

(5) Displayed Image on the Screen & Operation of this Embodiment by the User:

FIGS. 26, 27 and 28 respectively are diagrams showing display screens of this embodiment of the index creating apparatus. A description will be given of the operation of this embodiment by referring to FIGS. 26, 27 and 28.

When the operation of this embodiment of the index creating apparatus is started, a main display screen shown in FIG. 26 is displayed on the display unit 30. Various operation buttons are displayed in the upper column of the display screen shown in FIG. 26, and the contents of the documents are displayed in the lower column of a document display region. For example, the normal index word is displayed in green without an underline, the important index word is displayed in green with an underline, the index word which is automatically extracted is displayed in magenta without an underline, the normal index word specified by the user is displayed in blue without an underline, the important index word specified by the user is displayed in blue with an underline, and the retrieving word is displayed in red. The green display is indicated by a rightwardly descending hatching, the magenta display is indicated by a leftwardly descending hatching, the blue display is indicated by vertical stripes, and the red display is indicated by dots.

The display screen shown in FIG. 26 includes the following:

"<Index Display> Button" which displays the display screen shown in FIG. 28;

"[Retrieving Word] Edit Control" which edits the retrieving words;

"<Retrieve> Button" which retrieves the word specified by the [Retrieving Word] Edit Control;

"Line Display" which displays the line number of the starting line and all of the lines of the document which is being displayed;

"<Index Word Specify> Button" which is used to specify the index word;

"<Important Index Word Specify> Button" which is used to specify the important index word;

"<Word Conversion> Button" which is used when converting the attribute of the word such as the index word within the document and the index word created by the user;

"[Document Switching] Box" which is used when switching the document to be displayed;

"Cursor" which is used when specifying the index word and selecting a command, where the shape of the cursor changes depending on the index word specifying mode or the cursor position; and "Document Display Region" which displays the document.

Next, a description will be given of the operation of the display screen shown in FIG. 26.

(a) Specifying the Index Word:

When the <index word specify> button of the window is selected, the color of the <index word specify> button and the color of the cursor change. Hence, when the portion of the document which is to be registered as the index word is selected by dragging a mouse (that is, pointing device 31) while pushing a left button of the mouse, the specified word is copied to the [retrieving word] edit control, and the color of the portion which is to be registered as the index word changes.

(b) Specifying the Important Index Word:

First, the <important index word specify> button of the window is selected. Thereafter, the operation described above under (a) is carried out. As a result, the color of the portion which is to be registered as the important index word changes.

(c) Canceling the Specified Index Word:

The specified index word is canceled by moving the cursor to the word which is to be deleted and then making a click by a right button of the mouse.

(d) Retrieving the Word:

First, the retrieving word is input to the [retrieving word] edit control. When the index word or the important index word is specified, the specified index word is automatically input to the [retrieving word] edit control.

When the <retrieve> button is selected, a dialog box shown in FIG. 27 is displayed on the display screen. Hence, a [retrieve all documents] button or a [retrieve only displayed document] button is selected.

When the [retrieve all documents] button is selected, the retrieval is made with respect to all of the documents read by the index creating apparatus. On the other hand, when the [retrieve only displayed document] button is selected, the retrieval is made with respect to only the document which is displayed on the index creating apparatus. In addition, a [cancel] button is selected if the retrieval which is being made is to be discontinued.

A message is displayed when the retrieval ends, the appearing position is set in the [jump] box, and the color of the retrieving word changes. When an item of the [jump] box is selected, it is possible to display the position where the retrieving word appeared.

(e) Level Conversion of the Word:

The level conversion of the word can be categorized into the following types. That is, the level conversion may convert the normal index word into the important index word, convert the important index word into the normal index word, and convert the retrieving word into the normal index word.

When making the level conversion of the word, a <convert> button of the window is selected, and the color of the <convert> button and the shape of the cursor change. The cursor is moved to the word the level of which is to be converted, and a click is made by the left button of the mouse.

(f) Jump:

When [word retrieval] or [display appearing position of index word] is selected, the jump position is set in the [jump] box.

In order to display the document at the jump position in the [document display region], the display position is selected by the [jump] box. The jump position is specified by the document number and the line number which are read.

(g) Index Display:

In order to display the index, an <index display> button of the window is selected, so as to display an [index] dialog box shown in FIG. 28. As shown in FIG. 28, the[index] dialog box is displayed on top of the main screen in an overlapping manner.

The [index] dialog box is made up of the following items:

[Order] Option which specifies the order with which the index words in the alphabetical order or appearing order are to be displayed;

[Attribute of Displaying Index Word] Option which specifies the attribute from (1-a) <Index Word Within Document> indicating the index word specified within the document, (1-b) <Index Word Specified By User>indicating the index word specified by the user in the index creating apparatus, and (1-c) <Automatically Extracted Index Word> indicating the index word which is automatically extracted by the index creating apparatus;

[Level of Index Word] Option which specifies the level of the index word to be displayed by the normal index word and the important index word;

[Index Word Number] which displays information related to the number of all of the index words, normal index words and important index words; and

[Order] List Box which displays the heading of the order. The [Order] List Box includes the following:

[Index Word] List Box which displays the index word of the heading selected by the [order] list box;

[Appearing Document] List Box which displays the document in which the index word selected by the [index word] list box appears;

[Appearing Line] List Box which displays the line on which the index word of the document selected by the [appearing document] list box appears;

[Delete] Button which is used to delete the specified index word;

[Appearing Position Display] Button which is used to display the appearing position of the specified index word in the document in the window of the index creating apparatus; and

[End] Button which is used to close the [index] dialog box and to return to the window of the index creating apparatus.

(i) Index Word Display Method:

In order to display the index word in the [index] dialog box, the heading is first selected from the [order] list box, and the index word included in the heading is displayed in the [index word] list box. Then, the index word in the [index word] list box is selected, and the document which includes this index word is displayed in the [appearing document] list box.

Next, the document in the [appearing document] list box is selected, and the line which includes the index word of the appearing document is displayed in the [appearing line] list box.

(i—i) Display of the Index Words in Alphabetical Order (or Order of the Japanese Kana Syllabary):

An [alphabetical order (or order of the Japanese kana syllabary)] of the [order] option is selected when arranging the index words in the alphabetical order (or order of the Japanese kana syllabary). Hence, the [order] list box displays the headings in the alphabetical order (or order of the Japanese kana syllabary).

(i-ii) Display of Index Words in Appearing Order:

An [appearing order] of the [order] option is selected when arranging the index words in the appearing order. In this case, the [order] list box displays the headings in the appearing order.

(i-iii) Display of Index Words Within Document:

When displaying the word which is already specified in the document as the index word, <index word within document> of the [attribute of displaying index word] option is selected. If the heading of the [order] list box is selected, the specified word which is specified in the document as the index word is displayed in the [index word] list box. In addition, it is possible to display both [display of index word specified by user] and [display of automatically extracted index word].

(i-iv) Display of Index Word Specified By User:

In order to display the word which is specified as by the user as the index word, <index word specified by user> of the [attribute of displaying index word] option is selected. If the heading of the [order] list box is selected, the index word specified by the user is displayed in the [index word] list box. In addition, it is possible to display both the [display of index word within document] and [display of automatically extracted index word].

(i-v) In order to display the automatically extracted index word, <automatically extracted index word> of the [attribute of displaying index word] option is selected. If the heading of the [order] list box is selected, the automatically extracted index word is displayed in the [index word] list box. Further, it is possible to display both the [display of index word within document] and [display of index word specified by user].

(i-vi) Display of Normal Index Word:

In order to display the normal index word, <normal index word> of the [level of index word] option is selected. If the heading of the [order] list box is selected, the normal index word is displayed in the [index word] list box. Moreover, it is possible to also display the [display of important index word].

(i-vii) Display of Important Index Word:

In order to display the important index word, <important index word> of the [level of index word] option is selected. If the heading of the [order] list box is selected, the important index word is displayed in the [index word] list box. In addition, it is possible to also display the [display of normal index word].

(i-viii) Deletion of Index Word:

In order to delete the index by the [index] dialog box, the index to be deleted is selected, and the [delete] is selected. In this case, all of the specified index words will be deleted if only the index word is selected. In addition, if the document is selected, the specified index word included in the selected document is deleted. Furthermore, if the appearing line is specified, the index word on the specified line of the selected document is deleted. A plurality of appearing lines may be selected.

(i-ix) Display of Appearing Position of Index Word:

In order to display the appearing position of the index word in the [index] dialog box, the index word the appearing position of which is to be displayed is first selected. The selection of the index word may be made in a manner similar to that made when displaying the index word. If only the index word is selected, the appearing position of the specified index word is displayed in all of the documents. On the other hand, if the document is selected, the appearing position of the specified index word included in the selected document is displayed. Further, if the appearing line is specified, the appearing position of the index word in the specified line of the selected document is displayed. A plurality of appearing lines may be selected.

Next, when the <appearing position display> button is selected, the [index] dialog box is closed, and the appearing position of the index word is set in the [jump] box. The first appearing position of the index word is displayed in the [document display region]. In addition, when the <index display> button of the window is selected, the [index] dialog box is displayed.

Further, the present invention is not limited to these embodiments, but various variations and modifications may be made without departing from the scope of the present invention.

What is claimed is:

1. An index creating apparatus for creating indexes of documents displayed on display means, said index creating apparatus comprising: analyzing means for analyzing a format of an index word from an input document and for explaining the index word;

first display control means comprising:
  registering means for registering a specified portion of a document which is displayed on said display means as the index word,
  canceling means for canceling the specified portion of the document which is displayed on said display means and registered as the index word, and
  retrieving means for retrieving a specified index word from registered index words,
  said first display control means displaying the input document on the display means together with the portion corresponding to the index word, so that the portion corresponding to the index word is displayed differently from other portions of the input document;

storage means for storing information related to the registered index words; and filling means for obtaining an output document by filling the index word into the input document with a predetermined format and outputting the output document.

2. The index creating apparatus as claimed in claim 1, which further comprises:

second display control means comprising:
  display means for displaying an appearing position of the specified index word in the input document; and
  deleting means for deleting the specified index word, said second display control means displaying the index word read from said storage means on the display means according to a predetermined rule.

3. The index creating apparatus as claimed in claim 2, which further comprises:

a first dictionary which registers keywords for judging whether or not to extract the index word from each sentence within the input document;

a second dictionary which registers keywords for dividing each sentence within the input document;

a third dictionary which registers unwanted words which are inappropriate as the index word; and automatic extracting means for making reference to said first, second and third dictionaries and automatically extracting the index word from the input document.

4. The index creating apparatus as claimed in claim 3, which further comprises:

a reading dictionary which registers reading of the registered index words, said reading indicating how the registered index words are pronounced; and means for making reference to said reading dictionary and automatically adding the reading to the index word registered by said registering means and/or to the index word automatically extracted by said automatic extracting means.

5. The index creating apparatus as claimed in claim 4, which further comprises:

third display control means comprising:
  editing means for editing the reading of the index word; and
  means for registering the index word and the reading of the index word into said reading dictionary.

6. The index creating apparatus as claimed in claim 2, wherein said second display control means includes means for displaying on the display means an index word which satisfies a condition, by instructing the said second display control means of a kind of index word such as normal/important index words, existing index word within the input document, the index word specified by said registering means or the specifying/extracting state of the index word such as the index word automatically extracted by said automatic extracting means, and the appearing position of the index word.

7. The index creating apparatus as claimed in claim 3, wherein said first display control means includes means for distinguishing and displaying on the display means a kind of index word and a specifying/extracting state of the index word, by instructing said first display control means of the kind of index word such as normal/important index words, existing index word within the input document, the index word specified by said registering means or the specifying/extracting state of the index word such as the index word automatically extracted by said automatic extracting means.

8. The index creating apparatus as claimed in claim 1, which further comprises:

a first dictionary which registers keywords for judging whether or not to extract the index word from each sentence within the input document;

a second dictionary which registers keywords for dividing each sentence within the input document;

a third dictionary which registers unwanted words inappropriate as the index word; and automatic extracting means for making reference to said first, second and third dictionaries and automatically extracting the index word from the input document.

9. The index creating apparatus as claimed in claim 8, which further comprises:

a reading dictionary which registers reading of the registered index words, said reading indicating how the registered index words are pronounced; and means for making reference to said reading dictionary and automatically adding the reading to the index word registered by said registering means and/or to the index word automatically extracted by said automatic extracting means.

10. The index creating apparatus as claimed in claim 9, which further comprises:

third display control means comprising:
  editing means for editing the reading of the index word; and
  means for registering the index word and the reading of the index word into said reading dictionary.

11. The index creating apparatus as claimed in claim 8, wherein said first display control means includes means for distinguishing and displaying on the display means a kind of index word and a specifying/extracting state of the index word, by instructing said first display control means of the kind of index word such as normal/important index words, existing index word within the input document, the index word specified by said registering means or the specifying/extracting state of the index word such as the index word automatically extracted by said automatic extracting means.

12. The index creating apparatus as claimed in claim 1, which further comprises:

a reading dictionary which registers reading of the registered index words, said reading indicating how the registered index words are pronounced; and means for making reference to said reading dictionary and automatically adding the reading to the index word registered by said registering means.

13. An apparatus for creating an index of a document, comprising:

an analyzing unit to analyze a format of an index word;

a display unit to display a portion of the input document; and a control unit to register a specified portion of the input document which is displayed, as the index word, said control unit displaying the input document on the display unit together with the specified portion corresponding to the index word, so that the portion corresponding to each occurrence of the index word is displayed differently from other portions of the input document.

* * * * *

UNITED STATES PATENT AND TRADEMARK OFFICE
CERTIFICATE OF CORRECTION

PATENT NO.: 5,845,305
DATED : December 1, 1998
INVENTOR(S): Nobuo KUJIRAOKA

It is certified that error appears in the above-identified patent and that said Letters Patent is hereby corrected as shown below:

| | |
|---|---|
| Col. 12, | lines 39-40, delete paragraph break; |
| | lines 50-51, delete paragraph break. |
| Col. 15, | lines 42-43, delete paragraph break. |
| Col. 17, | line 13, change "can" to --can--; |
| | line 20, change "is" to --is-- and change "with" to --with--; |
| | line 21, change "," to --,--; |
| | line 22, change "can" to --can--, change "be" to --be-- and change "." to --,--. |
| Col. 22, | line 54, begin a new paragraph with "analyzing". |
| Col. 23, | line 16, begin a new paragraph with "said second". |

Signed and Sealed this

Fifteenth Day of June, 1999

Attest:

Q. TODD DICKINSON

*Attesting Officer*     *Acting Commissioner of Patents and Trademarks*